US009646298B2

(12) United States Patent
Corbalis et al.

(10) Patent No.: US 9,646,298 B2
(45) Date of Patent: May 9, 2017

(54) METHOD AND SYSTEM FOR DETERMINING LOCATIONS OF TAGS

(71) Applicant: Doorga, Inc., Palo Alto, CA (US)

(72) Inventors: Charles Matthew Corbalis, Saratoga, CA (US); Michael Edward Matthys, Los Altos Hills, CA (US); David Paulsen, Mountain View, CA (US); Charles M. Robidart, Jr., San Martin, CA (US)

(73) Assignee: Doorga Inc., Palo Alto, CA (US)

( * ) Notice: Subject to any disclaimer, the term of this patent is extended or adjusted under 35 U.S.C. 154(b) by 38 days.

(21) Appl. No.: 14/814,330

(22) Filed: Jul. 30, 2015

(65) Prior Publication Data

US 2016/0050530 A1     Feb. 18, 2016

Related U.S. Application Data

(60) Provisional application No. 62/038,368, filed on Aug. 18, 2014.

(51) Int. Cl.

| | |
|---|---|
| *H04W 24/00* | (2009.01) |
| *G06Q 20/32* | (2012.01) |
| *G06Q 30/02* | (2012.01) |
| *H04W 4/00* | (2009.01) |
| *H04H 20/61* | (2008.01) |
| *H04W 4/02* | (2009.01) |
| *H04W 12/06* | (2009.01) |
| *H04M 1/725* | (2006.01) |

(Continued)

(52) U.S. Cl.
CPC ..... *G06Q 20/3278* (2013.01); *G06Q 20/3224* (2013.01); *G06Q 30/0261* (2013.01); *G06Q 30/0267* (2013.01); *H04H 20/61* (2013.01); *H04L 63/0428* (2013.01); *H04M 1/7253* (2013.01); *H04W 4/008* (2013.01); *H04W 4/023* (2013.01); *H04W 4/028* (2013.01); *H04W 12/02* (2013.01); *H04W 12/06* (2013.01); *H04M 1/72572* (2013.01); *Y02B 60/50* (2013.01)

(58) Field of Classification Search
CPC ....... H04W 4/02; H04W 64/00; H04W 4/008; H04W 4/021; H04W 4/023; H04W 4/028; H04W 76/023
USPC ...... 455/456.1, 412.1, 456.6, 433, 466, 419, 455/456.5, 415, 41.2, 39, 521, 3.01
See application file for complete search history.

(56) References Cited

U.S. PATENT DOCUMENTS

| | | | |
|---|---|---|---|
| 2016/0055360 A1* | 2/2016 | Haugarth | G06Q 30/0201 340/10.1 |
| 2016/0140831 A1* | 5/2016 | Hermann | G08B 21/24 340/573.1 |

FOREIGN PATENT DOCUMENTS

| | | | | |
|---|---|---|---|---|
| KR | 1020070086752 | * | 8/2007 | G08B 21/02 |

* cited by examiner

*Primary Examiner* — Joseph Arevalo
(74) *Attorney, Agent, or Firm* — Joe Zheng

(57) ABSTRACT

Techniques for detecting the presence of a tag are described. According to one aspect of the present invention, a plurality of devices are deployed around an establishment, each of the devices is executing a client module to communicate with a server and receive a broadcast from a tag attached to an object (e.g., a human being or an item). As the object approaches to a device, the broadcast from the tag is received by a device that reports to the server. As a result, the server executing a server module can determine a movement trajectory of the object from those devices that have received the broadcast from the tag. One embodiment of the present (Continued)

invention can be used to track an asset or facilitate a location-based service to a user wearing the tag.

15 Claims, 27 Drawing Sheets

(51) Int. Cl.
*H04L 29/06* (2006.01)
*H04W 12/02* (2009.01)

Block Diagram of a typical
Bluetooth Low-Energy Integrated Circuit

| Octet # | Field | Value |
|---|---|---|
| 0 | Preamble | 0xAA |
| 1 | Access Address | 0xD6 |
| 2 | | 0xBE |
| 3 | | 0x89 |
| 4 | | 0x8E |
| 5 | Adv Channel PDU byte 0 | 0x00 |
| 6 | Adv Channel PDU byte 1 | 0x24 |
| 7 | Tag's Bluetooth MAC Address | 0xFF |
| 8 | | 0xFF |
| 9 | | 0xFF |
| 10 | | 0xF6 |
| 11 | | 0xD4 |
| 12 | | 0xFC |
| 13 | Length of Next Field | 0x02 |
| 14 | Flag Field ID | 0x01 |
| 15 | Flags | 0x06 |
| 16 | Length of Next Field | 0x1A |
| 17 | Mfgr Specific Field ID | 0xFF |
| 18 | Apple Corporation's Bluetooth ID | 0x4C |
| 19 | | 0x00 |
| 20 | Type = iBeacon | 0x02 |
| 21 | Length of Next Field | 0x15 |
| 22 | Tag Service Provider's UUID | Tag Specific |
| 23 | | Tag Specific |
| 24 | | Tag Specific |
| 25 | | Tag Specific |
| 26 | | Tag Specific |
| 27 | | Tag Specific |
| 28 | | Tag Specific |
| 29 | | Tag Specific |
| 30 | | Tag Specific |
| 31 | | Tag Specific |
| 32 | | Tag Specific |
| 33 | | Tag Specific |
| 34 | | Tag Specific |
| 35 | | Tag Specific |
| 36 | | Tag Specific |
| 37 | | Tag Specific |
| 38 | Unique Tag ID which is encrypted for security purposes | Tag Specific |
| 39 | | Tag Specific |
| 40 | | Tag Specific |
| 41 | | Tag Specific |
| 42 | TX Power | Tag Specific |
| 43 | CRC [Calculated over octets 5 thru 42] | Tag Specific |
| 44 | | Tag Specific |
| 45 | | Tag Specific |

Fixed for all packets (octets 0–37)
Variable; 64 different values (octets 38–41)
Fixed for all packets (octet 42)
Calculated for each packet (octets 43–45)

FIG. 8

One embodiment of the Bit Combiner for generating an encrypted Tag ID

One embodiment of a Tag ID decryptor using a 6-bit key and randomized look-up tables Extracted Key K<5:0> points to decode A and B Tables. A<12:0> and B<12:0> used to look up real values A'<12:0> and B'<12:0> which are concatenated to form the original Tag ID One embodiment of a Bit Extractor for decrypting a Tag ID

| Address | Contents |
|---|---|
| 0 | 0xAA |
| 1 | 0xD6 |
| 2 | 0xBE |
| . . . | (fixed packet contents) |
| 37 | Last octet of UUID |
| 38 | TX Power |
| 39 | Tag Transmit Power |
| 40 | Config Flags |
| 41 | LedOnDuration |
| 42 | LedOffDuration |
| 43 | EncryptPageDuration |
| 44 . . . 63 | (not used) |
| 64 65 66 67 | Enctrypted Tag ID for K=0 |
| 68 69 70 71 | Enctrypted Tag ID for K=1 |
| 72 . . . 314 | <continues K=2 thru K=62> |
| 315 316 317 319 | Enctrypted Tag ID for K=63 |

FIG. 16

Memory Map for Non-Volatile Memory

State Machine Controller Logic-1

State Machine Controller Logic-3

Tag Reader Functionality – First Time App is Run

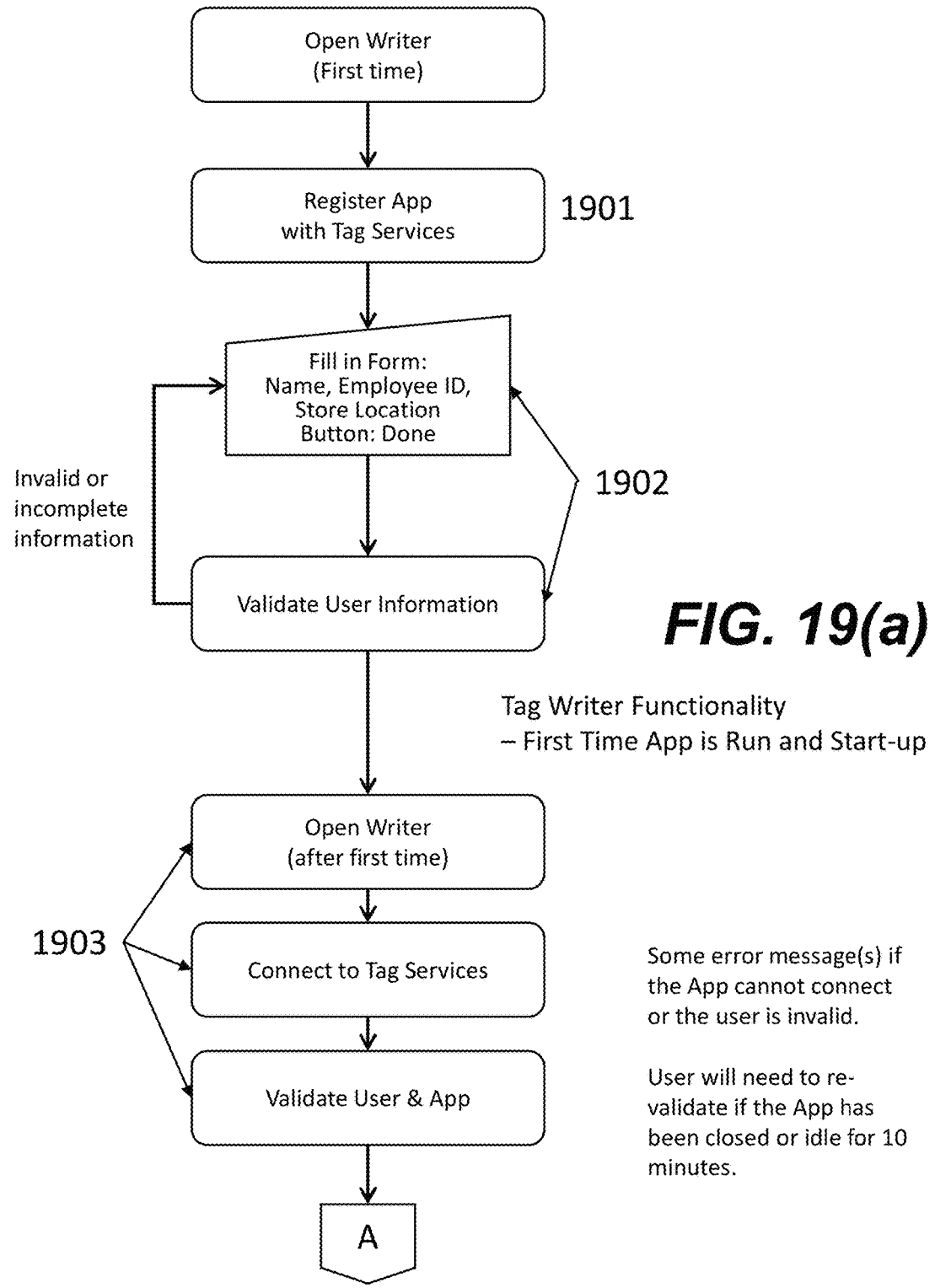

Tag Writer Functionality- Various

Tag Writer Functionality- Choose from List

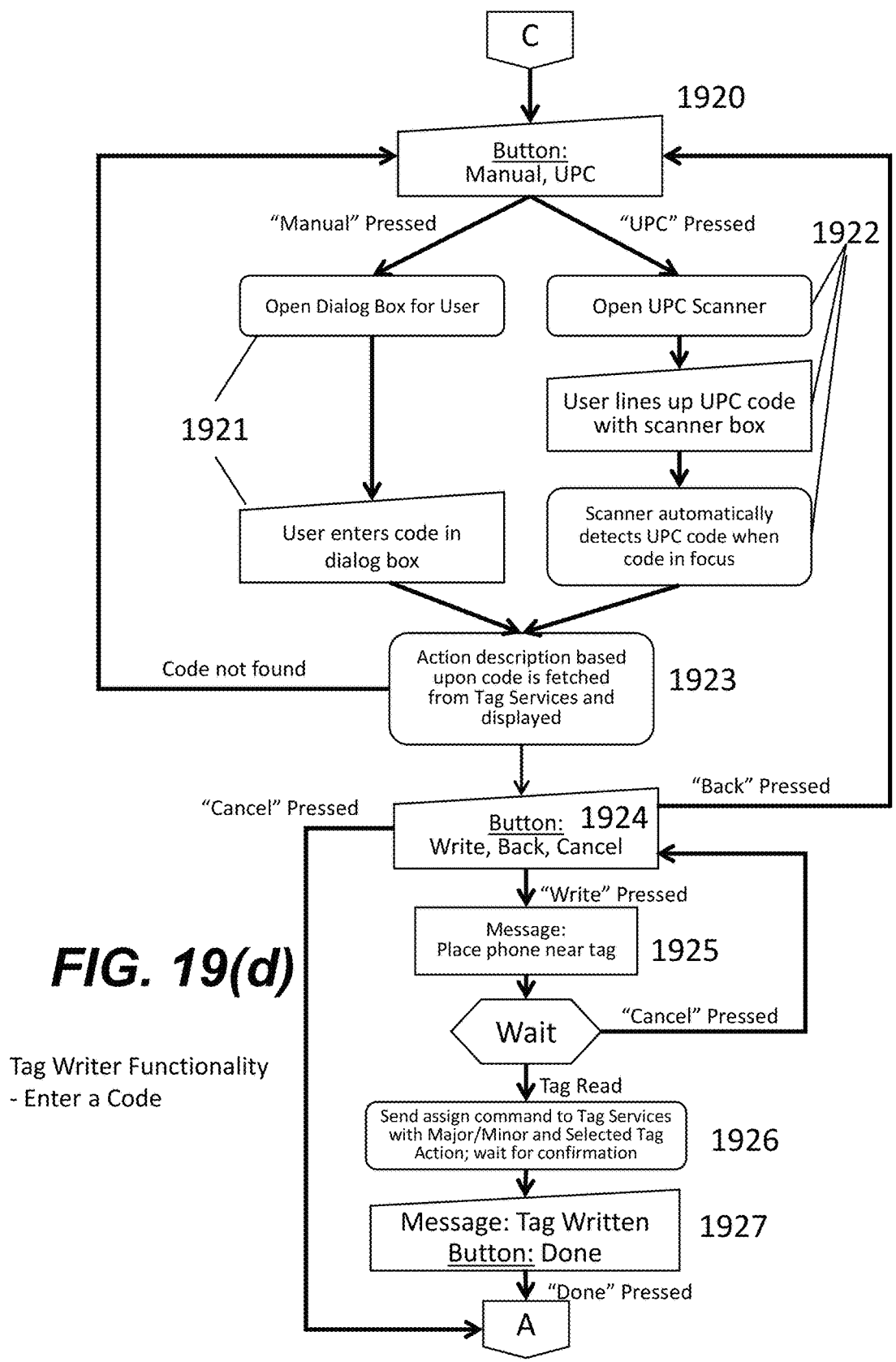

MVC Diagram of Tag Services Software

METHOD AND SYSTEM FOR DETERMINING LOCATIONS OF TAGS

CROSS-REFERENCE TO RELATED APPLICATIONS

This application claims the benefits of U.S. Provisional Application No.: 62/038,368, filed Aug. 17, 2014, and entitled "Method and system for enabling micro-proximity detection, check-in, and information access to improve customer engagement and advertisement accuracy", which is hereby incorporated by reference for all purposes.

BACKGROUND OF THE INVENTION

Field of the Invention

The present invention is generally related to the area of retail commerce. Particularly, the present invention is related to method, system, and device for enabling micro-proximity location, detection and services.

Description of the Related Art

Modern smartphones typically incorporate a number of communications subsystems for location services. One exemplary incorporated subsystem uses the Global Positioning System (GPS) for basic outdoor location services. This GPS subsystem uses signals from multiple geo-stationary satellites to determine the longitude and latitude position of a smartphone. Such a technology is effective out-of-doors with an accuracy of plus or minus two meters, but loses accuracy inside of buildings as the building roof and structure scatters the satellite signals. The GPS solutions also rapidly deplete the battery life of the mobile phone due to the high power consumption used to satisfy the need for rapid updated measurements from the geo-stationary satellites as the user changes their location. While GPS is a solution for outdoor location services, there is a need for indoor location services.

Currently, the Wi-Fi signal strength between a smartphone and one or more Wi-Fi Access Points (AP) has been used in conjunction with a Global Position System (GPS) to determine the indoor location of the smartphone (the user thereof) within an establishment. By measuring received Wi-Fi signal strength of periodic broadcasts from the smartphone at each AP, Indoor Positioning System (IPS) software running on a Wi-Fi controller connected to each of the APs can triangulate on the location of the smartphone, achieving an position accuracy within plus or minus one meter. There are, however, several problems with this solution. In the GPS case, the application running on the smartphone is a module determining the location of the phone. In the Wi-Fi IPS case, the location information is being collected and tracked by an external processor. Getting information from the external processor to the smartphone can be problematic because it typically requires an affirmative action by the user with his/her smartphone. Such affirmative action might require the user to connect to a specific Wi-Fi network by a name identifier, or require the user to connect to a specific website, or require the user to open a specific application on the smartphone. In addition, the Wi-Fi IPS solution is relatively expensive to purchase, install, and operate since even the lowest-cost APs may cost from US$50 to $75 per AP, and each AP location is restricted to a location within the reach of electric outlet power since Wi-Fi APs cannot operate on limited battery power. Additionally, the Wi-Fi signals used for location-triangulation can be scattered and disrupted by fixtures and other movable structures within a building, and a radio phenomenon called multi-path, in which copies of the original Wi-Fi radio signal are created when the original signal is bouncing off interference from indoor structures such as walls and ceilings. All of these problems make triangulation accuracy below a couple of meters impossible. Thus there is another need for solutions to determine a fairly precise location indoor.

More recently a new technology for location and proximity services has been introduced, called "Bluetooth Low Energy (BLE) beacons", which overcome some of the problems with the Wi-Fi IPS. They are easier to install than Wi-Fi APs. Like GPS, a smartphone performs the location discovery so there is no need for a separate processor which is external to the smartphone, no need to get location information to the phone from another processor, and the solution scales to any number of smartphones. BLE beacons are also typically battery operated making their placement in an establishment easier. However, BLE beacons do suffer some problems. First, they are implemented using standard general-purpose Bluetooth Low-Energy integrated circuits available from vendors such as Texas Instruments and Nordic Semiconductor. As they are designed to meet the full range of Bluetooth specifications, they are quite overly sophisticated and costly devices.

Another technology incorporated into some smartphones that can enable and assist in providing location and proximity services is Near Field Communication (NFC). Unlike the Wi-Fi IPS or BLE beacons, NFC devices are typically passive and only operate based on power received from radio waves of a smart phone that physically touch or nearly-touch the NFC device. When a smartphone is placed within a millimeter or less to an NFC device, the device is activated and generates a near field radio frequency signal that the smartphone can read. NFC devices are often packaged as stickers that can be attached to movable structures or even directly to products. If a user touches the device with his smartphone, a resident app can read the information encoded in the device. NFC is also sometimes used to enable short communication directly between two smartphones, such as an exchange of photographs, when they "bump" or physically touch each other. Clearly, NFC can be used for precise location and proximity services, however, it always requires that the user take an action to place the smartphone physically against the device. Therefore, it cannot be used for passively locating a user within a radius of the device by either a mobile or fixed smartphone. In addition, passive NFC devices can only broadcast the same static content and therefore cannot be easily protected so that only specific targeted mobile applications on smartphones are allowed to read the NFC device static content. In other words, any third party smartphone application can easily read such NFC devices and generate unwanted content to be displayed to the user on the smartphone.

Still another technology that currently exists for indoor location and proximity services is Radio Frequency Identification (RFID). While these devices are inexpensive and can be incorporated into stickers or badges, they suffer from two major disadvantages. First, most smartphones are not equipped to read RFID tags while a typical mobile RFID reader may cost more than $1500 USD. Secondly, while fixed readers for automatically and remotely locating RFID devices do exist, they require a costly RF infrastructure consisting of deploying multiple RFID antennas that are connected, by coaxial cables, to a shared reader. This shared reader is responsible for periodically energizing the RFID devices within the range of a given antenna and then listening for their presence and relative distance. The cost of the antennas, shared reader and infrastructure can run to many thousands of US dollars per reader installation. Hence there are many applications for which RFID is not economically viable for indoor location and proximity services.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques for enabling micro-proximity location, detection and services. According to one aspect of the present invention, an electronic device, referred herein as micro-proximity tag or simply tag, is used in conjunction with mobile devices to provide the micro proximity location services. These tags may be disposed at specific locations to be detected by a mobile device. For example, in a retail store, such tags are individually disposed near specific products being displayed. When a user carrying a mobile phone standing near a product being displayed, the phone is caused to receive signals from a tag disposed specifically for the product. The presence of the user with respect to the product is detected.

According to another aspect of the present invention, some content in the broadcast by such micro-proximity tags is encrypted and therefore securely protected so that only authorized mobile applications can read the content. When the presence of the user before a specific product is detected, the application running on the mobile phone receives a content message targeted based on the specific product and causes the phone to display the message and send out a message (e.g., a visual or an audio alert).

According to still another aspect of the present invention, a plurality of such tags are respectively disposed near specific objects across a complex (e.g., a store). A module is executed in mobile devices respectively associated with a group of contestants, where the contestants are contesting to discover the specific objects, for example, to see promotions or advertisements thereof.

According to still another aspect of the present invention, a client module is designed or configured to verify the purchase intent by consumers by confirming their locations in front of a specific product display, or that a consumer has approached a cash register after viewing an online advertisement of the product that was previously displayed on his/her mobile device.

According to still another aspect of the present invention, the client module is designed or configured to track assets and/or personnel within an enterprise. In this application, a micro-proximity tag is attached to an asset and/or provided in a card form to a person. Fixed devices are strategically placed around the enterprise. As assets and/or personnel enter into a range of the fixed devices, their presence and approximate distance are reported periodically to a centralized device (e.g., a server).

According to still another aspect of the present invention, the client module is designed or configured to confirm the location of a consumer at a specific table in a restaurant in order to enable a wide variety of restaurant applications on mobile phones including menu display, service request, bill presentation, payment, and etc.

According to still another aspect of the present invention, the tag is specifically designed. Relevant parameters of the tag can be selected and determined via a device (e.g., a mobile device) running the client module in a predefined mode (e.g., write mode v. read mode). Not only is the transmission power controlled to a small amount for detection of a nearby device, but the tag also operates periodically (e.g., every 2 or 10 seconds) to preserve the power driving it. The tag generates a transmission signal in compliance with a wireless technology standard so that the transmission signal can be received by a commonly-used device (e.g., a smartphone). In addition, for simplicity, the tag is not designed as a transceiver but operates as a transmitter only.

According to yet another aspect of the present invention, the tag is specifically designed to transmit variable powers according to a pattern. At one moment, the transmission power is decreased to a minimum so that the tag can only be heard at a certain distance by devices running the client module. At another moment, it may be desirable for the tag to be heard by a device many meters away, in which case the tag is caused to broadcast a signal (e.g., data packets) at a high transmission power. In any case, the signal is broadcast periodically or at predefined regular intervals, or this broadcast only occurs when a device is detected within a predefined radius distance from the tag.

To ensure that the micro-proximity tags can be easily deployed without too much on-site technical expertise, additional aspects of the present invention are developed as a server module or a cloud-based software platform, referred herein as micro-proximity tag services, which operates with the tags, to enable simplified on-site association of a device with a set of predefined actions (hereinafter as tag actions). Examples of the tag-actions include: opening a browser per a particular URL, opening a mobile application with a particular message, or notifying a server of an interested customer. The micro-proximity tag services are provided via a server running a server module specifically designed to implement one embodiment of the present invention. In one embodiment, the micro-proximity tag Services allow an untrained retail employee to use a mobile application to scan a UPC bar code of a specific product or product display, and then read the micro-proximity tag, thereby forming an association between the product and the tag.

In addition, a platform is developed to enable a series of online information updates to confirm that a specific consumer has been located at a micro-proximity location(s) such as a product display or restaurant table. These updates might include the date and time that the consumer was located by a specific device, the content or URL displayed to the consumer, and location-based profile update of the consumer based on the specific device location.

The present invention may be implemented in various ways including an apparatus, a method or a system. According to one embodiment, the present invention is a method for providing tag services, the method comprises: receiving in a server a message from a device caused to receive a broadcast from a tag, wherein the tag is disposed at a location, the broadcast includes at least one data packet, the message is generated by a client module being executed in the device in responding to the broadcast, and includes an identity of the tag, wherein a portion of the identity is encrypted; generating in the server a response to the message in accordance with the identity and a profile of a user associated with the device; sending the response to the device; causing the client module to digest the response, wherein the client module is configured to cause the device to display a promotion message on a display screen of the device.

According to another embodiment, the present invention is a method for providing tag services, the method comprises: providing a client module to be loaded in a device, the client module being automatically invoked when receiving a first broadcast from a first tag, wherein the client module is registered with a server configured to provide the tag services; generating by the client module a message when the device gets near a second tag and receives a second broadcast from the second tag, the broadcast including at least one data packet; determining a distance between the device and the second tag, wherein the message includes an identity of the second tag and the determined distance; transporting the message to the server identified by a predefined link, wherein the server is configured to generate a response to the message in accordance with the identity and a profile of a user associated with the device; and causing the device to perform an action when the client module receives the response from the server.

According to still another embodiment, the present invention is a system for providing tag services, the system comprises: a plurality of tags respectively disposed across an establishment, each of the tags designed to broadcast to a short range and receive no signals when set to detect a presence of a mobile device coming nearby; and a server executing an installed server module configured to communicate with the mobile device when the mobile device is caused to receive a broadcast including the data packets from a tag, wherein the mobile device is loaded with a client module registered with the server, the server is configured to receive a message from the device and generate a response to the message, and wherein the message includes an identity of the tag. Each of the tags packaged in a small form factor operates periodically on one or more batteries and comprises: an antenna; a state machine controller provided to randomize data packets for transmission in accordance with a wireless technology standard; and a direct digital synthesizer provided to synthesize correct signal waveforms based upon data provided by the state machine controller and generate data packets to be broadcast via the antenna and to be received by the mobile device.

According to still another embodiment, the present invention is a tag to facilitate tag services, the tag comprises: a battery, an antenna, a wake-up timer to turn on and off operations of the tag per a predefined timing, wherein the tag acts as a transmitter to transmit a broadcast in accordance with a wireless standard, a state machine controller provided to randomize data packets, a direct digital synthesizer provided to synthesize signal waveforms based upon data provided by the state machine controller and generate data packets to be broadcast via the antenna, and a memory space to store at least an identifier of one tag action that is included in the broadcast and causes a device receiving the broadcast to react per the tag action, wherein the device is loaded with a client module that is configured to digest the broadcast, the tag action is one of tag actions predefined on a server.

According to still another embodiment, the present invention is a method for determining a location of a tag, the method comprises: receiving in a server a message from a device caused to receive a broadcast from a tag, wherein the device is disposed at a location, the tag is attached to an object moving in an establishment, the broadcast includes at least one data packet, the message is generated by a client module being executed in the device in responding to the broadcast, and includes an identity of the tag and an estimated distance determined by the client module in reference to a transmission power of the broadcast received in the device, updating a profile created for the object in reference to the received message, wherein the profile includes information pertaining to the identity of the tag, and requesting an updated message from the device regarding the tag.

According to yet another embodiment, the present invention is a system for determining a location of a tag, the system comprises: a plurality of devices respectively disposed around an establishment, each of the devices executing a client module configured to cause the each of the devices to receive a broadcast from a tag attached to an object, wherein the tag is designed to generate the broadcast from time to time in accordance with a wireless standard, a device receives the broadcast when the object moves close to the device, and a server, remotely located with respect to the devices, executing a server module to communicate with each of the devices and receives a message from the device when the device receives the broadcast from the tag, wherein the message is generated by the client module being executed in the device in responding to the broadcast, and includes an identity of the tag and an estimated distance determined by the client module in reference to a transmission power of the broadcast received in the device, the identity includes a universally unique identifier (UUID) and an identifier (ID) of the tag, and wherein the ID is encrypted.

Different objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 8 shows an advertisement packet per the iBeacon format;

FIG. 16 to FIG. 19(d) show collectively an exemplary design of the state machine controller that may be sued in FIG. 13.

DETAILED DESCRIPTION OF THE INVENTION

The detailed description of the present invention is presented largely in terms of procedures, steps, logic blocks, processing, or other symbolic representations that directly or indirectly resemble the operations of data processing devices. These descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

The present invention pertains to a method, a platform, a device and an application each of which is designed to enable micro-proximity location, detection and services f. As used herein, any pronoun references to gender (e.g., he, him, she, her, etc.) are meant to be gender-neutral. Unless otherwise explicitly stated, the use of the pronoun "he", "his" or "him" hereinafter is only for administrative clarity and convenience. Additionally, any use of the singular or to the plural shall also be construed to refer to the plural or to the singular, respectively, as warranted by the context. One of the benefits, advantages and objectives in the present invention is to detect the presence of a user with respect to an object and provide a set of services in accordance with the presence.

Figure 1:
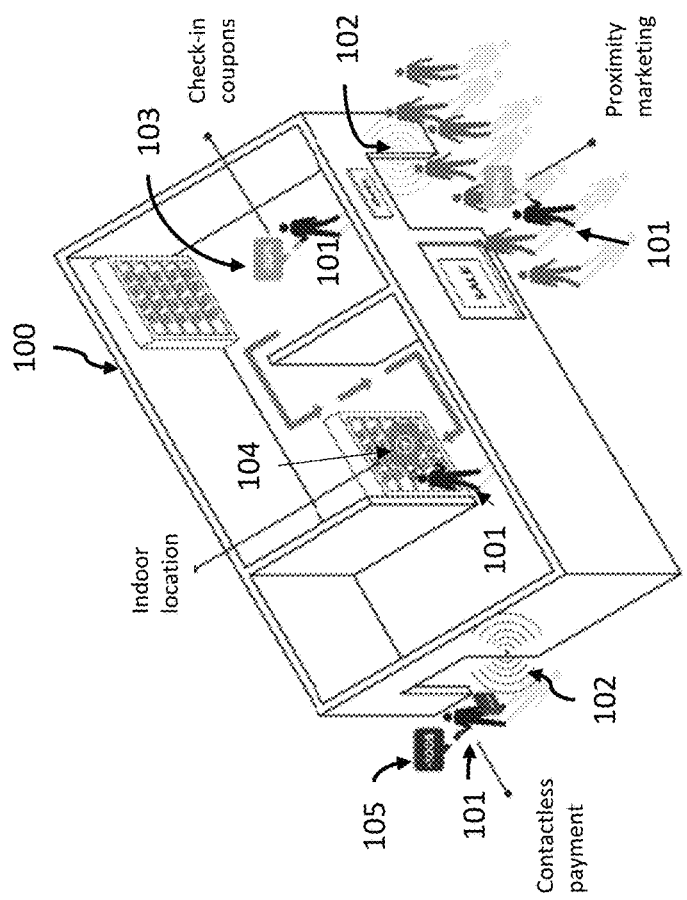
FIG. 1 shows an exemplary retail environment in which one embodiment of the present invention may be practiced, where a plurality of micro-proximity tags or tags are respectively disposed across the environment.

Referring now to the drawings, in which like numerals refer to like parts throughout the several views. FIG. 1 shows an exemplary retail environment 100 in which one embodiment of the present invention may be practiced. A plurality of micro-proximity tags or tags are respectively disposed across the environment 100. Not specifically shown in FIG. 1, there are tags respectively placed near specific products on display. These tags are used to detect the presence of users standing in front the products to show their potential interests in these products. According to one embodiment, there are two such tags 102 located at the entrance and exit of the establishment 100. Depending on implementation, the tag at the entrance may activate a module if already installed in the mobile devices carried by the users, alert a user to download a module if not yet installed, to count users coming to the establishment 100 and etc., the tag at the exit may activate the module in the mobile devices to perform mobile payments, or to count users leaving the establishment 100 and etc. The details of the module will further described below.

As a user or customer 101 navigates in the establishment 100, his mobile device running the client module is caused to detect any signals from the deployed tags. When the user 101 stands before a displayed product for a predefined period (e.g., 1 minute), the presence of his mobile device 101 is detected by the tag and reported to a computing device (e.g., a service server) remotely located with respect to the tag. As further detailed below, triangulation may be used in the software mobile or a server to provide specific location based services 104. In reference to the detected location, designated location and proximity services may be provided to the user 101. Depending on what the establishment 100 is for, promotions or coupons may be pushed to the mobile device being carried by the user 101. In one embodiment, contactless or mobile payment may be executed when the user 101 is detected to be leaving the establishment 101.

Figure 2:
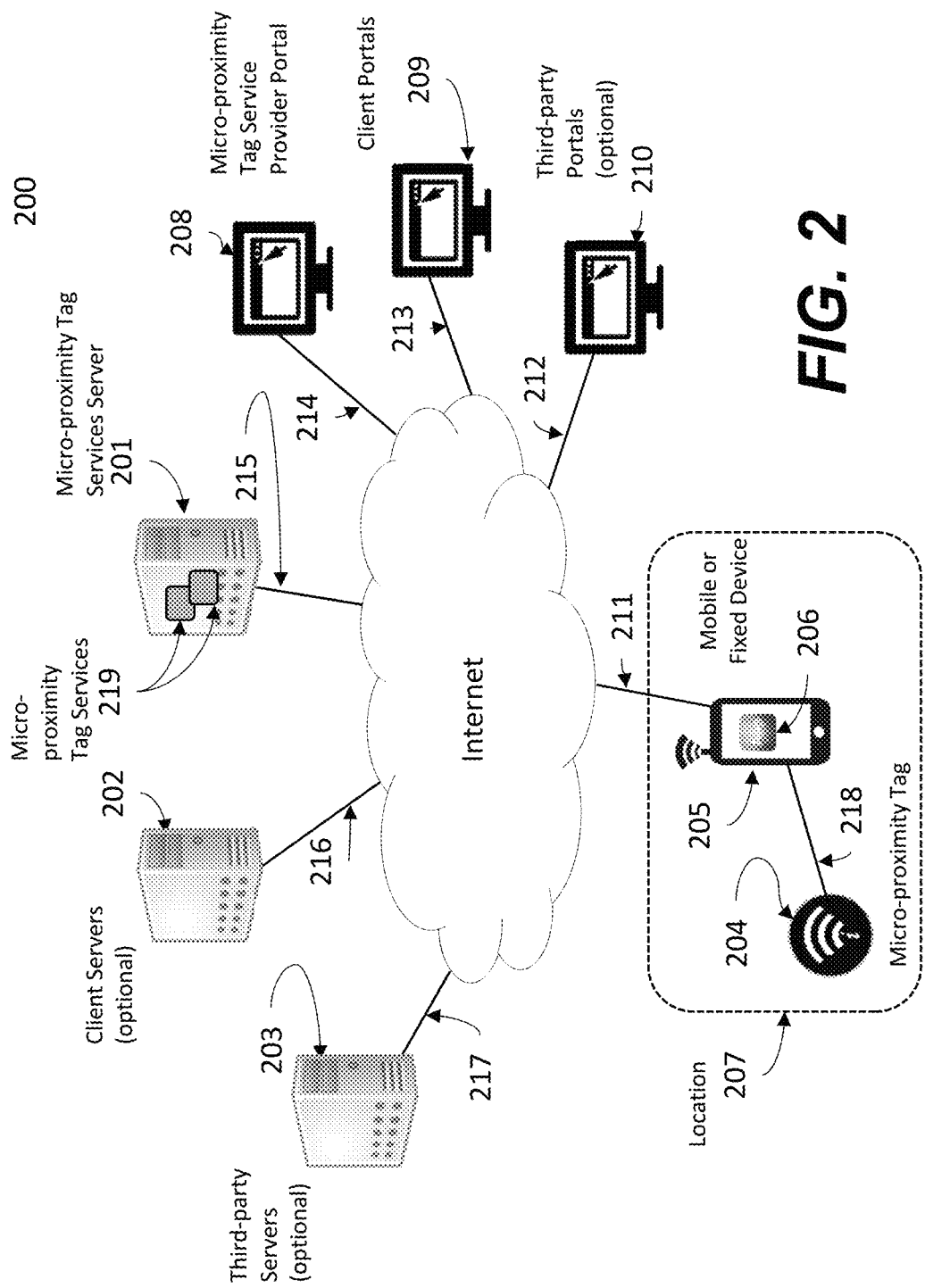
FIG. 2 shows an functional block diagram of providing micro-proximity tag services according to one embodiment of the present invention.

Referring now to FIG. 2, it shows an functional block diagram 200 of providing micro-proximity tag services according to one embodiment of the present invention. As shown, a tag 204 is located at a location 207, a mobile device 205 running a client module or an application (app) 406 is caused to listen to a signal from the tag 204 over a communication channel 218 when in close proximity to it. It should be noted that the mobile device 205 may be replaced with a fixed electronic device to detect the presence of a tag attached to an item or a card form carried by a person, in which case the fixed device is disposed to detect the presence of the tag. Those skilled in the art shall understand that the operations of the tag and a device, regardless which one is mobile. remain substantially similar. Unless specifically stated herein, the description below is based on the assumption that a mobile device is being carried by a user while a tag is relatively stationary.

The device 205 is coupled to a network (e.g., the Internet or a combination of wireless and wired network) over a communication channel 211. In one embodiment, both channels 211 and 218 are wireless. Also coupled to Internet is a micro-proximity tag services server or simply service server 201 and two or more control portals 208 and 209. In one embodiment, the portal 208 is operated by a service provider (a.k.a., micro-proximity tag service provider portal) while the portal 409 is accessible by clients (a.k.a., client portals). Optionally, there are one or more additional servers such as client servers 202 and/or third-party servers 203 coupled to the network.

The service server 201 is loaded and executes a software package (not shown) that is referred to a server module implementing one embodiment of the present invention. The micro-proximity tag services are provided by the server module via the server 201. According to one embodiment, the presence of the device 206 is detected by the tag 204, the device 206 is caused to receive a message from the tag 204, the message in return causes the device 206 to communicate with the server 201, where the server 201 may be configured to send one or more promotion messages to the device 206 with respect to an item attracting the attention of a user carrying the device 206. Depending on implementation, the promotion message may be a discount coupon, a further description of the item or a link to another website where different versions of the item may be shown. In one embodiment, the install module is designed to provoke the function of mobile payment or enable a regular payment towards a selected item on the device 204.

Figure 3:
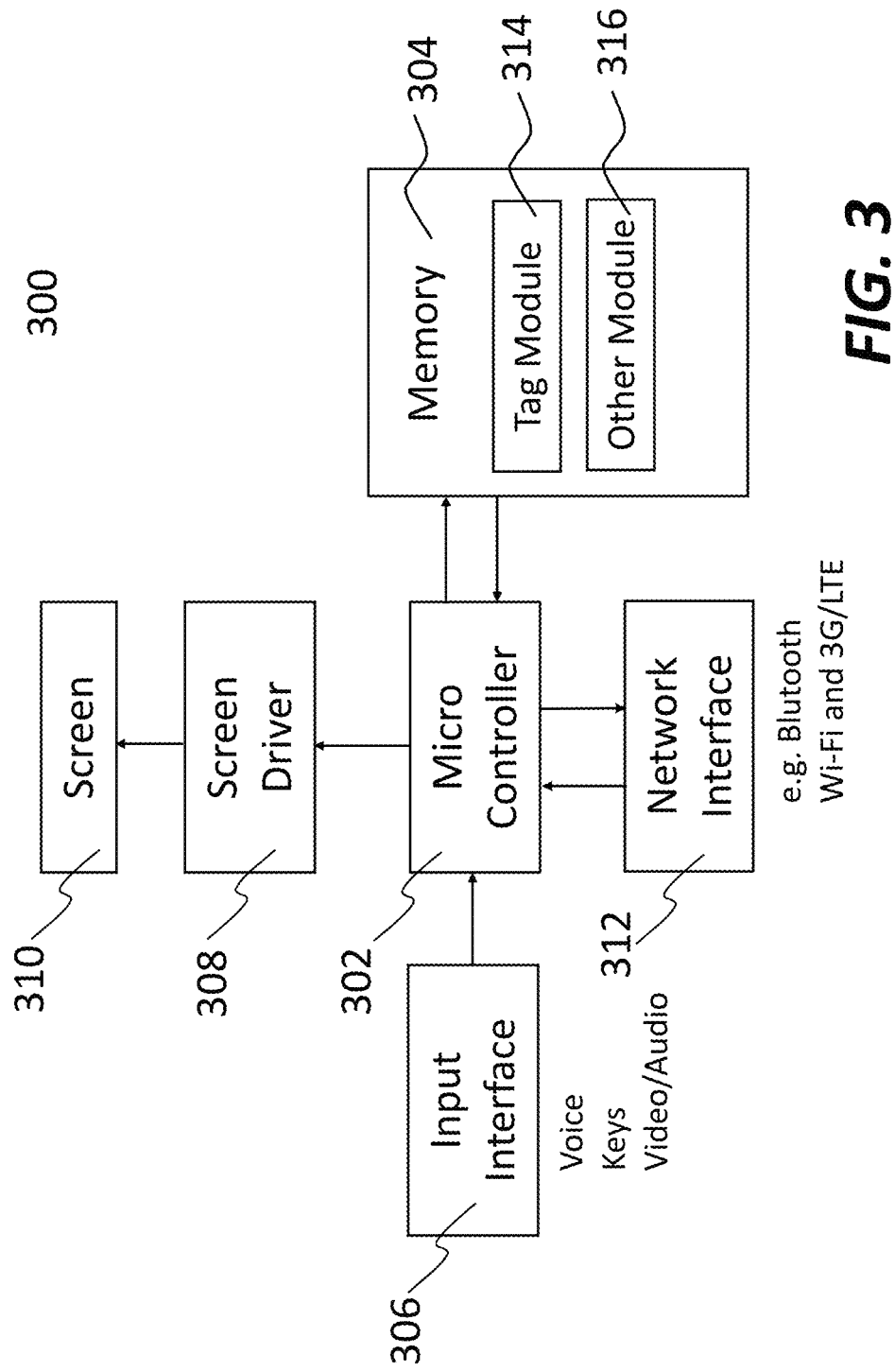
FIG. 3 illustrates an internal functional block diagram of a mobile device that may be used in FIG. 1 or FIG. 2, wherein the mobile device is loaded with a client module provided by a service provider in FIG. 2.

Referring now to FIG. 3, it illustrates an internal functional block diagram 300 of a mobile device that may be used in FIG. 1 or FIG. 2. The mobile device includes a microprocessor or microcontroller 302, a memory device 304, an input interface 306, a screen driver 308 to drive a display screen 310 and a network interface 312. To make the mobile device operable with deployed tags in an establishment, the mobile device is caused to install an application or a module 314 in the memory device 304. The module 314, also referred to herein a client module, is a software version implementing one embodiment of the present invention, and downloadable over a network from a library (e.g., Apple Store) or a designated server.

In one embodiment, the module 314 is activated when a user of the mobile device is entering an establishment (e.g. an retail environment 100 of FIG. 1). As a result, the mobile device is enabled to receive a type of signal when the mobile device is moved within a range of a transmitter or transceiver. According to one embodiment, the mobile device is turned on by the module 314 to receive a low powered signal in compliance with the Bluetooth standard, where a tag is disposed nearby and powered to broadcast the low powered signal.

The input interface 306 includes one or more input mechanisms. A user may use an input mechanism to interact with the device 300 by entering a command to the microcontroller 302. Examples of the input mechanisms include a microphone or mic to receive an audio command from the user, or a keyboard (e.g., a displayed soft keyboard) to receive a texture command. Another example of an input mechanism is a camera provided to capture a photo or video, where the data for the photo or video is stored in the device for immediate or subsequent use with another application module 316. The driver 308, coupled to the microcontroller 302, is provided to take instructions therefrom to drive the display screen 310. In one embodiment, the driver 308 is caused to drive the display screen 310 to display a promotion message received via the network interface (e.g., Wi-Fi or 3G/LTE) in responding to the received signal from the tag nearby. Besides receiving the Bluetooth-compliant signal, the network interface 312 is provided to allow the device 300 to communicate with other devices via a designated medium (e.g., a data network).

According to one implementation, the module 314 is specifically designed to enable the device 300 to receive the Bluetooth-compliant signal. A generic computer is incapable of or not equipped with the capability of receiving such a signal. As will be further described below, the module 314 is configured to decrypt messages from a tag and cause the device 300 to communicate with a designated server (e.g., the tax service server 201 of FIG. 2).

Figure 5:
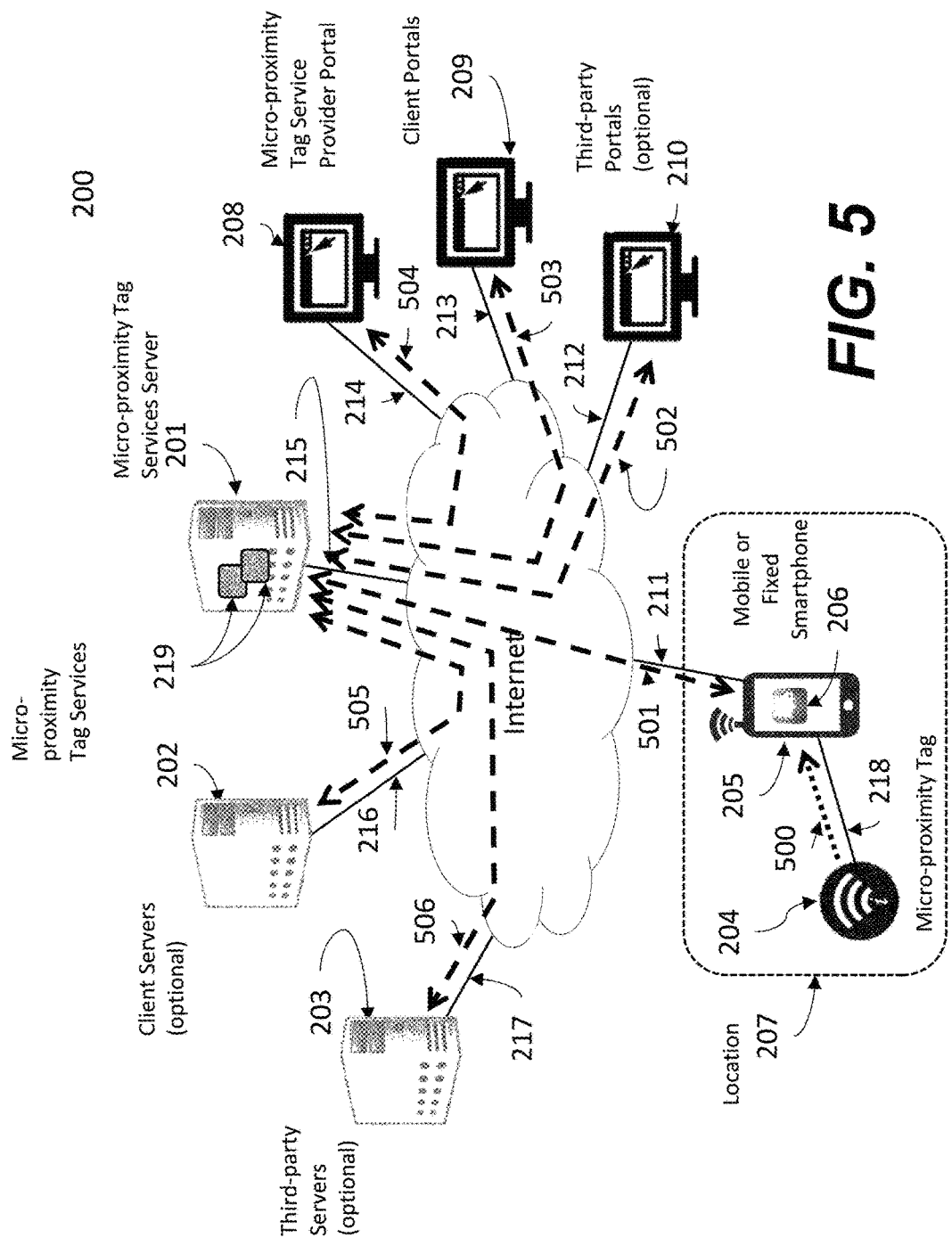
FIG. 5 shows exemplary communication data flows among the devices shown in FIG. 2 and FIG. 3 according to one embodiment of the present invention.

FIG. 5 shows exemplary communication data flows among the devices shown in FIG. 2 and FIG. 3 according to one embodiment of the present invention. Except for the flow 500 between the tag 204 and the device 205, all of the communication flows use a standard protocol (e.g., Hypertext Transfer Protocol or a secure version thereof) running over a bidirectional session. In one embodiment, the flow 500 includes one-way broadcast of a predefined signal (e.g., a BLE advertisement packet) which can be received by the device 205 when the tag 204 is within a range. The flow 501 operating between the device 205 and the server 201 is managed by a client module 206 running on the device 205 to exchange information about the tag 204 with the tag service module 219 being executed on the server 201.

The flows 202, 203, and 204 are used to allow third-parties, clients, and tag service providers to access information about the operation of and configure the behavior for the tag service module 219. Such access may be provided through the portals 208, 209, and 210 and use communication channels 212, 213, and 214, respectively with the network and communication channel 215 to effect the complete flows. In addition, the flow 505 causes the tag service module 219 to exchange information with various modules operating on the client servers 202 via communication channels 215 and 216 together with the network. The flow 506 allows the tag Services 210 to exchange information with the third-party server 203.

A tag service provider is the entity (e.g., a corporation or an individual) that provides various services to clients who typically own and operate a location with deployed tags. An example of the clients may include, but not be limited to, a retail chain (e.g., Macy's), an operator of vending machines, or a vendor booth at an industry trade show. A third party is an independent entity that may form a partnership with either a tag service provider or a client or perhaps both. An example of such a third-party may be an ad tracking company that analyzes user actions and provides profile information about a user whose device has been interacting with one or more tags in a location.

The tag services offered via the tag service module 219 include location and proximity services. According to one embodiment, one version of the client module 206 operates as a Tag Writer while another version of the client module 206 operates as a Tag Reader. As further described below, either function may be embedded into the client module 206 that has a different overall purpose with the use of a Software Development Kit (SDK) that may be provided in accordance with the tag service module 219. In one embodiment, the module 206 is configured as the Tag Writer dedicated to writing tags and the Tag Reader is functionally incorporated into a different version of the module 206.

According to one embodiment, the basic functionality of the micro-proximity tag services being provided via the server 201 includes at least three processes: a monitoring and tracking process, a "find me" process and a user interaction process.

In the first process, the device 205 is caused to monitor its environment listening for any signals from the micro-proximity tags that may be present nearby. The presence is detected via periodic reception of data packets transmitted over a wireless channel (e.g., a Bluetooth signal). This presence together with the RF power level at which these data packets are received are periodically reported to the server 201, where the micro-proximity tag service module 219 is configured to provide location and proximity services in accordance with the detected presence.

The second process is applicable to cases where the device 205 is a mobile type. In this process, the module 206 installed in the device 205 is configured to select a tag (e.g., the tag 204) that the user would like to find. The module 206 then guides the user to the immediate vicinity of the tag 204 by providing frequent distance estimates based upon the RF power level at which the data packets being transmitted from the tag 204 are received, thus guiding the user to where the tag 204 is located.

The third process also applies to the case where the device 205 is of the mobile type. In this case, three procedures are performed:
1. a client and/or third-party user defines a set of actions that they would like to enable for or provide to the users when they are near a specific location, such as immediately adjacent to a retail shelf, an advertising display or a product. This set of actions is called a tag action.
2. the client and/or third-party user places a tag at a specific location and associates it with a defined tag action.

3. a user moves his device within the vicinity of the tag which then triggers the previously defined tag action to occur.

The operations involved in these procedures are described in a more specific manner below.

One of the functions provided by the tag services is to allow a client and/or a third-party to create and manage the tag actions. The tag actions are a set of actions that a client and/or a third-party would like to have performed when a given tag is read. Examples of possible Tag Actions are:

Opening a browser and causing the browser to display a given Uniform Resource Locator (URL), where such a URL comprises a base URL optionally concatenated with a text string specifically assigned to the tag that was read;

Sending a message to the module 206 operating on the device 205, where the message comprises a text string optionally concatenated with a text string specifically assigned to the tag that was read;

Sending a specific mobile advertisement or promotion to the device 205 based upon a profile of the user with the device 205;

POSTing a message to an external server (such as client server 202 or third-party server 203) in which the message comprises a text or binary string optionally concatenated with a text or binary string specifically assigned to the tag that was read;

POSTing a message to a RESTFUL interface in which the message comprises a text or numeric string optionally combined with text or numeric strings specifically assigned to the tag that was read; and Taking no action.

A tag action may include one or more of these actions arranged in any order and include multiple instances of a particular type of action (for example, POSTs to several different servers). A tag action is defined by accessing the service module 219 via any of the appropriate portals: the tag service provider portal 208, the client portal 209, and the third-party portal 210. Any action that can be pre-defined and executed by a computer could qualify as a tag action provided that the service module 219 is configured to provide a mechanism for such actions to be so defined.

Once a tag action is defined, it can be assigned to one or more tags being deployed. In one embodiment, assigning a defined tag action to one or more Tags is performed through one or more of the portals. In general, a tag is uniquely identified with an identity. The identity may be a tuple of values: a Universally Unique Identifier (UUID), and a Tag ID. This tuple is signified by the nomenclature [UUID, Tag ID]. According to one embodiment, the module 206 is activated to select a tag-action from those defined, then read an identity of a tag and direct the tag services 219 from the server 201 to conduct the association. According to another embodiment, the module 206 is activated to allow a user to enter an identification string, such as a Universal Product Code (UPC), which is sent together with the identity of the tag to the server 201 to conduct the association between the tag and a tag Action that has been modified by the identification string. According to yet another embodiment, a UPC reader may be incorporated into the module 206 to acquire the identification string.

Once a tag has been written, which means that an identity has been assigned to a tag action, then a user with a device operating a client module configured to implement the tag reader function shall invoke the action or actions associated with the tag when the device is placed in close proximity to the tag. In addition, the tag services being offered via the module 219 can also relate this identity to any tag that is detected and read by the device. In both cases, The client module 206 is configured to cause the device 205 to receive a predefined signal from the tag 204 and send the identity thereof to the tag services offered on the server 201. On the server side, the tag service (server) module 219 is configured to decode and look up this unique identity and then execute one or more associated tag action(s). Other management and usage information is also gathered during this operation which will be described more thoroughly in the disclosure below.

A micro-proximity tag may come in any shape and small in small in size. One of functions of the tag is to broadcast a type of signal commonly receivable by a mobile device (e.g., iPhone) or a dedicated stationary device. One example of such signal is BLE Advertisement Packets at different RF power levels so that they can be commonly heard by a device. In some cases, it may be desirable for a tag to be heard by a device many meters away. In this case, a tag is designed to broadcast a signal (e.g., data packets) at a high transmission power. In other cases, it may be desirable for a tag to only be heard by a device only a few meters away, in which case, the tag is designed to transmit a signal at a low transmission power. In any case, the signal is broadcast periodically or at predefined regular intervals, or this broadcast only occurs when a device is detected within a predefined radius distance from the tag.

In one embodiment, a tag may transmit some data packets for a fixed device and some data packets for a mobile device at the same time. To avoid obstructing important aspects of the present invention, the description below is not for the use of these packets, nor the variable powers, but rather the combination of design choices that allow the electrical circuit needed to accomplish this task to be substantially simpler, smaller, lower power and less costly than using a conventional Bluetooth integrated circuit.

Figure 6:
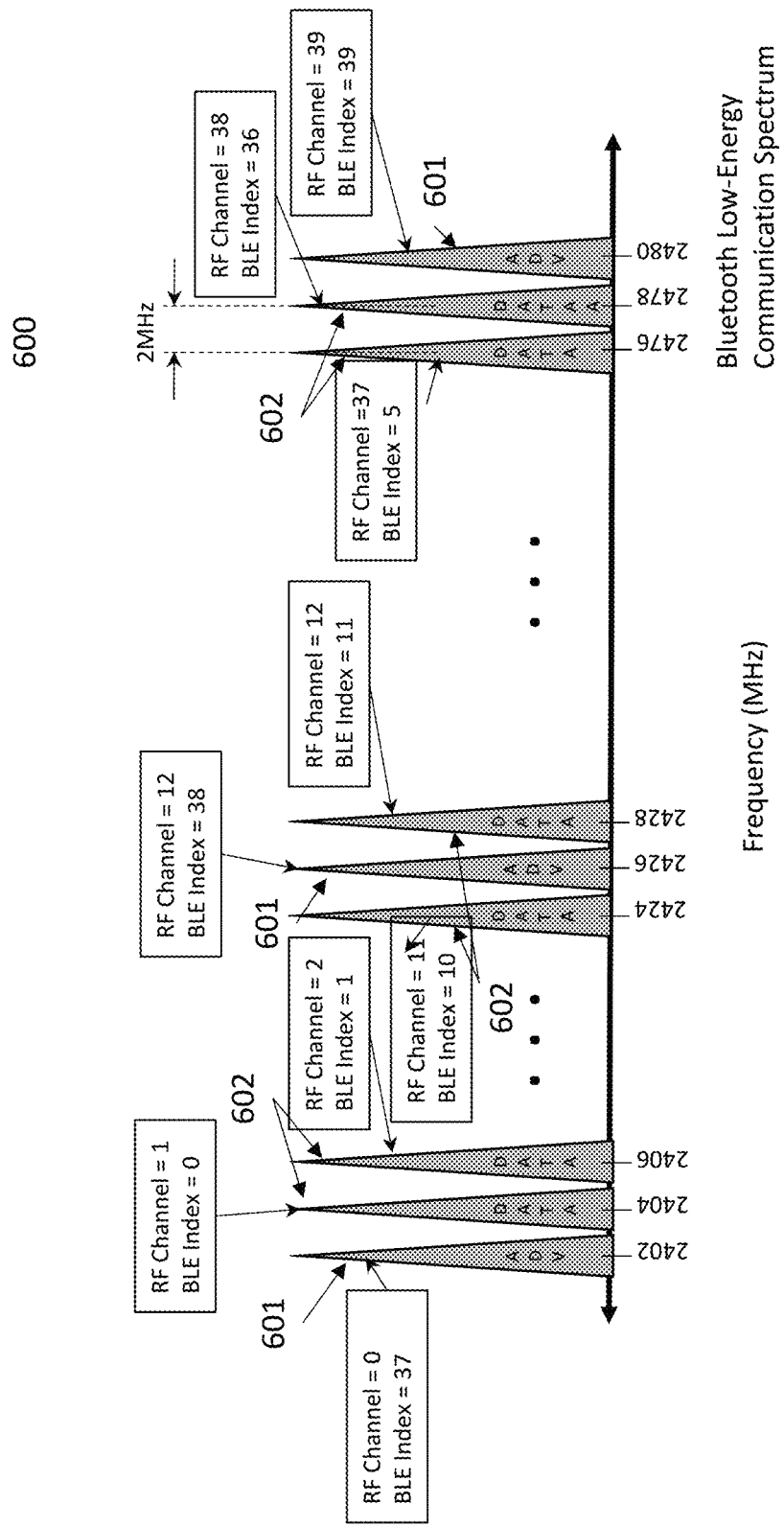
FIG. 6 shows a Bluetooth Low-energy communications spectrum 600.

According to one embodiment, the type of signal transmitted by a tag is Bluetooth Low-energy (BLE) packets. FIG. 6 shows a Bluetooth Low-energy communications spectrum 600. Communication between a BLE device and a Smartphone occurs on one of forty (40) 2 MHz wide radio-frequency (RF) channels centered on frequencies in the unlicensed Wi-Fi spectrum band beginning at 2.400 GHz up to 2.482 GHz. Each of the channels can support a 1 MHz data rate using a form of frequency shift key (FSK) modulation. The channels are subdivided into three advertisement channels 601 centered at 2.402 GHz, 2.426 GHz and 2.480 GHz and thirty-seven (37) data channels 602 centered at all of the channels not assigned for advertisement. The data channels 602 are numbered 0 to 36 and the advertisement channels 601 are numbered 37, 38, and 39, respectively. The BLE standards allow for a given BLE device to periodically broadcast fixed sized advertisement packets on one or more of the advertisement channels 601 in order to notify other BLE devices of the existence of the given BLE device. The number of advertisement packets is determined by an Advertisement Event that may include the given advertisement packet transmitted only on BLE channel 37, on channel 37 then channel 38, or on channel 37 then channel 38 then channel 39. According to the Bluetooth standards, an Advertisement Event, however, always begins on channel 37, however, other non-standard embodiments are also possible.

Figure 7:
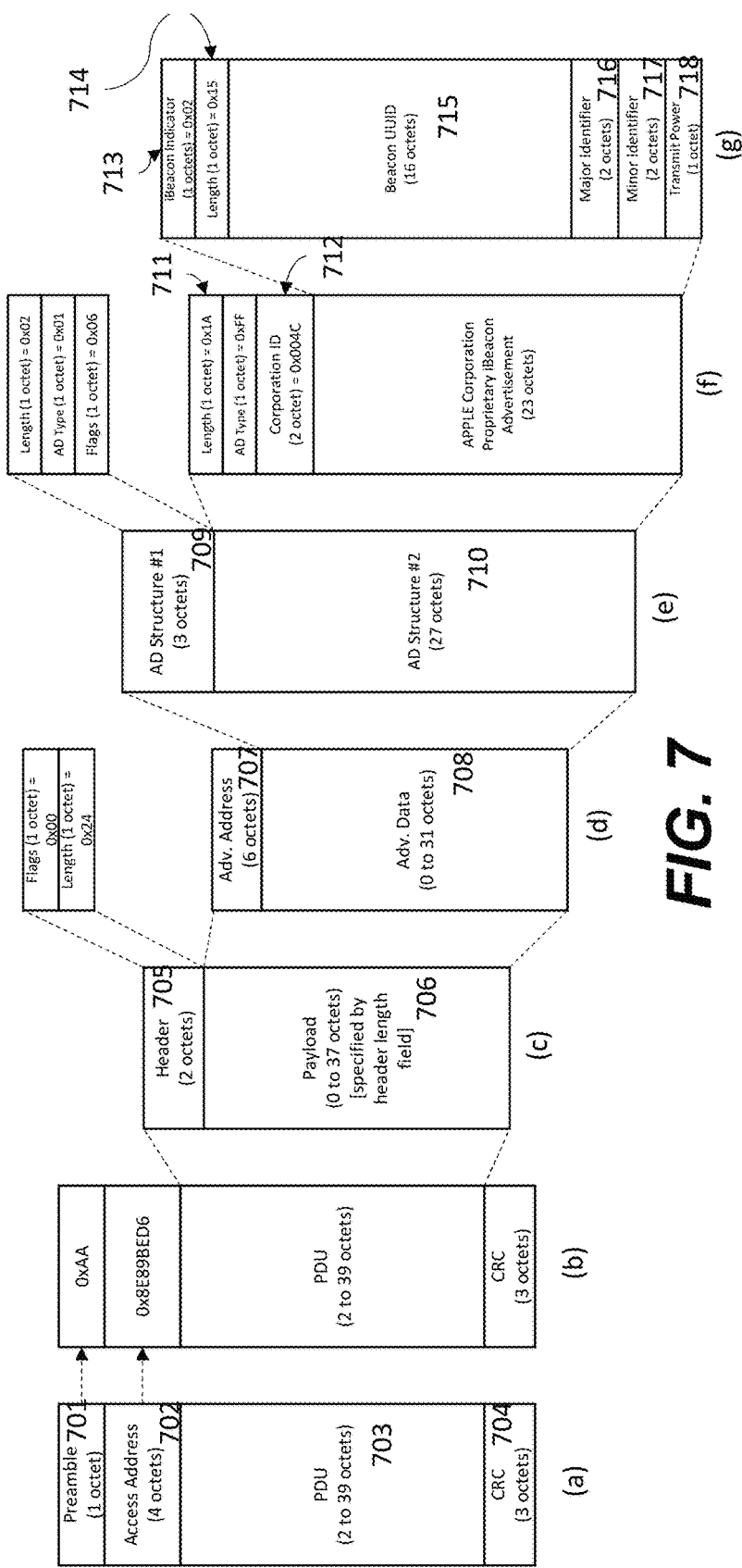
FIG. 7 depicts the anatomy of an Apple iBeacon packet.

One embodied format of this type of broadcast packet has been specified by Apple Inc. for their iPhone and iPad-based location services. This format and timing is called iBeacon. FIG. 7 depicts the anatomy of an Apple iBeacon packet. A basic BLE packet includes a packet depicted in FIG. 7(a)

consisting of a preamble octet 701, a four octet Access Address 702, a variable length Protocol Data Unit (PDU) 703 that can be as short as two octets and as long as thirty-nine (39) octets, and a twenty-four (24) bit (or three octet) CRC 704 calculated over the PDU 703. For all packets, the preamble 701 is set to 0xAA. For advertisement packets the Access Address 702 is set to 0x8E89BED6. FIG. 7(*b*) shows the corresponding numbers. The PDU 703 includes two fields: a two octet header field 705 and a payload field that can have up to thirty-seven (37) octets as specified in the length field 706 of the header 705. The payload for an advertisement packet includes a six octet Advertiser Address field 707, which may be the IEEE 802 address of the BLE device or simply a random data pattern and an Advertiser Data field 708. These formats are illustrated in FIG. 7(*c*) and FIG. 7(*d*). As depicted in FIG. 7(*e*) and FIG. 7(*f*), for the iBeacon format, the Advertiser Data field includes two "AD" structures. AD structure #1 709 is a three octet field indicating that this advertisement packet is a beacon, and AD structure #2 710, a twenty-seven (27) octet field which follows Apple's proprietary iBeacon format. As illustrated in FIG. 7(*f*), this format is indicated by the AD Type 711 Equal to 0xFF, the Apple identifier 712 of 0x004C. The final payload of this second AD structure is depicted in FIG. 7(*g*). It includes an identifier 713 set to 0x02, a length field 714 set to 0x15, a sixteen (16) octet universally unique identifier (UUID) 715, two 2-octet information fields called the Major Identifier 716 and the Minor Identifier 717 and a one octet transmit power 718 which is the 2's complement representation of the beacon's transmit power at a distance of one meter. The UUID 715 is used by the client module to register for certain types of beacons. The Major 716 and Minor 717 fields are used to say something unique about the specific beacon. The transmit power 718 allows the client module to determine the approximate distance from the beacon by comparing the power at one meter to the power that the packet was actually received by the BLE receiver circuitry within the device running the client module.

In one embodiment, a tag uses the iBeacon format as described above and shown in FIG. 7. FIG. 8 shows an advertisement packet 800 per the iBeacon format. As shown in this figure, all of the standard iBeacon fields are used with one exception. It shall be noted that the Advertisement PDU 804 type is set to 0x00 indicating that the Advertiser Address field 803 contains no valid information. However, in another embodiment, the Advertisement PDU could be set to 0x40 and a legitimate Advertiser Address field 803 could be present. In addition, the iBeacon standard TX Power value 805 is included and represents the RF power of the signal measured one meter away from the tag. The exception to the iBeacon format is that the Major identifier 716 and Minor identifier 717 fields are combined into a single thirty-two (32) bit (4 octet) field 801 which contains an encrypted version of a specific identifier (Tag ID) that, together with the UUID 802, uniquely identifies the Tag. The ability to make the tag specific to a given service provider using the UUID field 802 and to encrypt the Tag ID and place it in the encrypted Tag ID field 801 are significant improvements over passive NFC devices. A passive NFC device Reader can, in principle, read any NFC device, whereas, the client module is typically configured to only receive the advertisement packets from the tag, if it already knows and has pre-registered for the UUID 802. This allows a service provider to limit the client module to read a given tag.

Once an identifier of an NFC device has been read, the location, product or shelf that it is attached thereto is also known and can be used by non-client or non-service provider Apps to bypass the specific marketing campaign or message desired by the client or the service provider. For example, once an NFC device identifier is known for a given Sony Television, and it only needs to be read once and stored in a database to do so, any Apps with access to such a database can identify the NFC device as referring to a Sony Television and take arbitrary, possibly economically harmful action, such as presenting offers for competitive products at a lower price.

As a tag ID is encrypted, subsequent reads of the same tag would not necessarily result in the value in the encrypted Tag ID field 801 as it can, in one embodiment, change over time. In one embodiment, this encrypted Tag ID 801 changes as often as every hour.

There are many different ways to implement the encryption of the Tag ID to generate the encrypted Tag ID embedded in an advertisement packet. In all cases, encryption is accomplished by operating on the Tag ID with an algorithm that is driven by the combination of a private key and a public key. The encrypted value together with the public key are transmitted to the decryption logic that uses the public key, together with the private key that only the tag and the decryption logic know to re-create the original Tag ID. In some embodiments, the public key can be implicit, such as the current GMT time. For the purposes of this detailed invention description, one particular algorithm is described, however, many other algorithms are possible.

One objective of encrypting the Tag ID is to ensure that reception of a single advertising packet cannot be used to uniquely identify the tag without knowing the decryption algorithm. In the use case applications envisioned for a tag, the encryption requirements need are not very stringent. Basically, a client or service provider wants to be insured that anyone attempting to decrypt the encrypted Tag ID 801 would need to study the advertisement packets for a long period of time.

One embodiment an encryption and decryption algorithm that meets these requirements is described in FIG. 9 through FIG. 12. The basic idea behind this embodiment is that sixty-four (64) encrypted versions of a given Tag ID are calculated and stored in a tag. Further the tag contains a circuit, further described below, that changes the encrypted Tag ID that it is using in transmitted advertisement packets 800 approximately every hour. This means that in order for a tag unique Tag ID to be recognizable to a client module without knowing the decryption algorithm would require that the tag be monitored for 64 hours and all of the possible encrypted values captured. For the use case applications envisioned for the tag services, such an exercise would be onerous.

Figure 9:
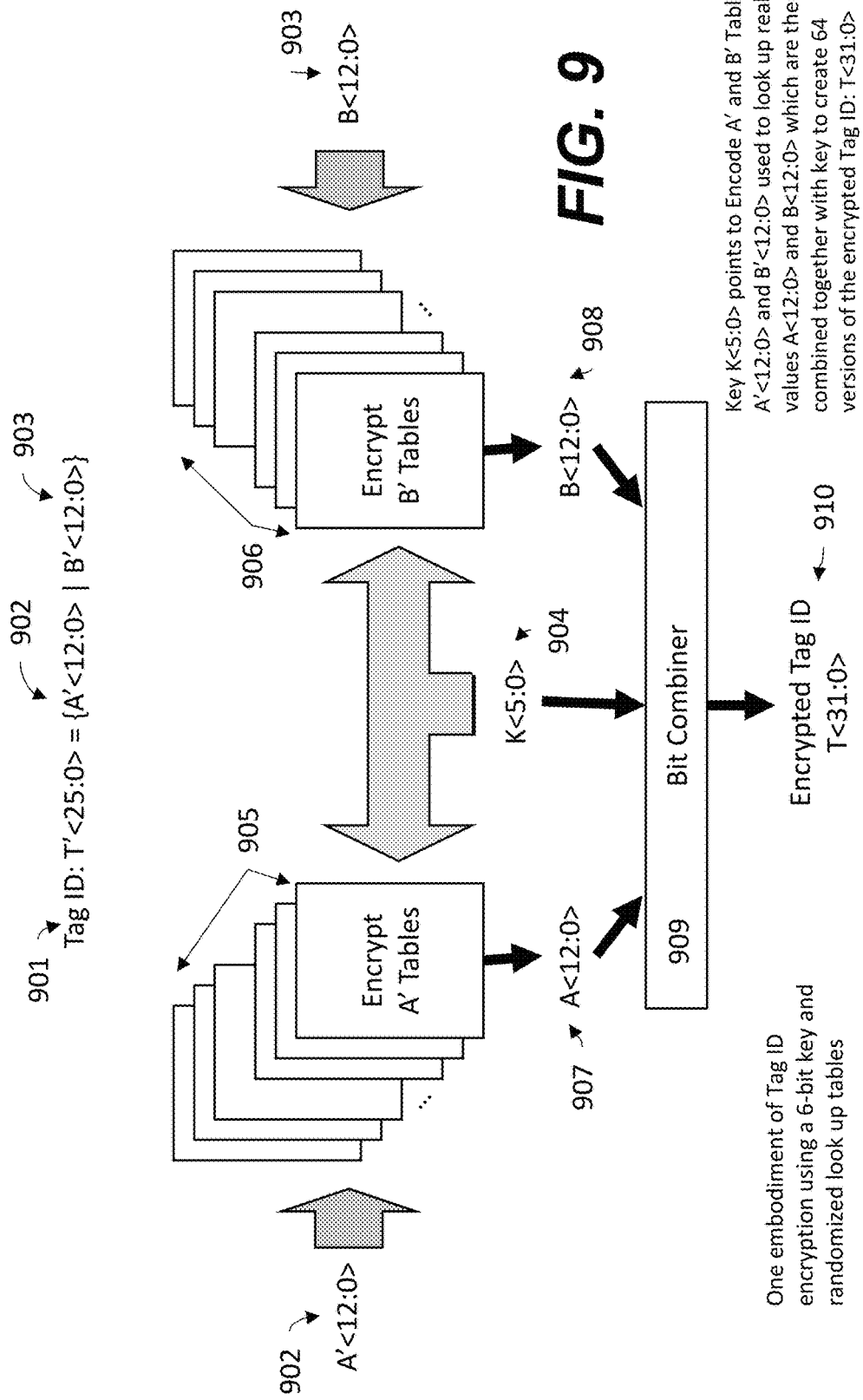
FIG. 9 to FIG. 12 shows an encryption and decryption algorithm that may be used to encrypt or decrypt a tag ID using a 6-bit key and randomized look up tables.
Figure 10:
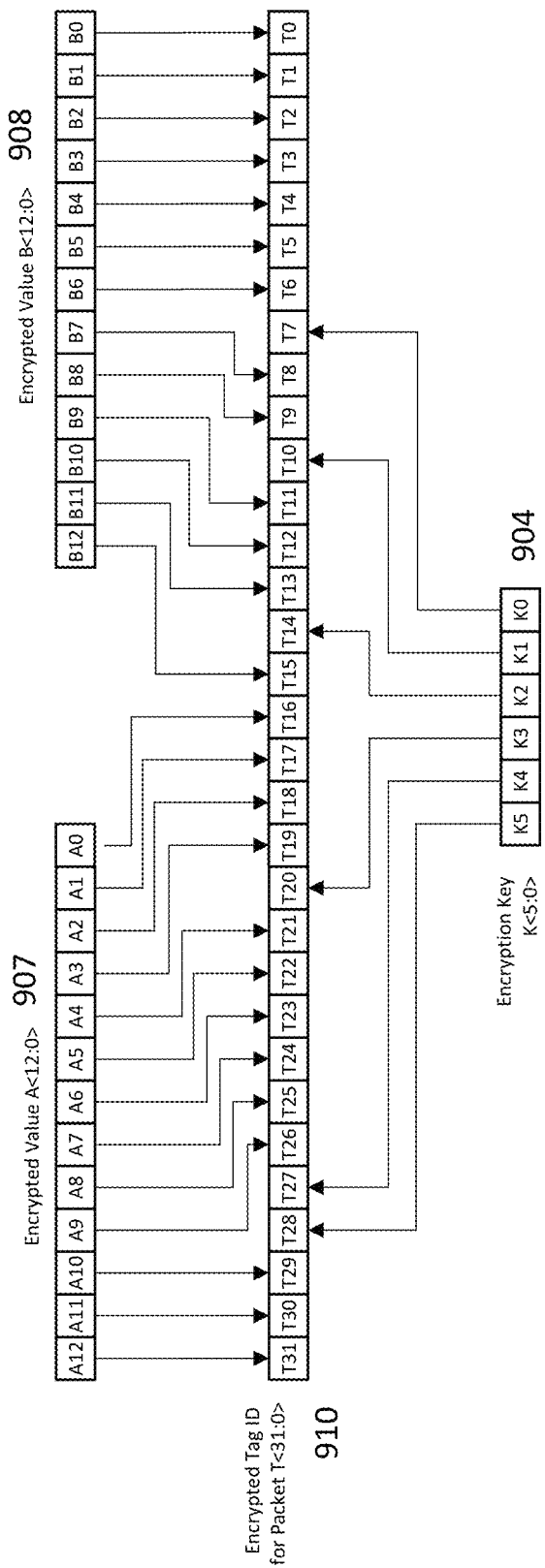

As depicted in FIG. 9, the Tag ID is a twenty-six (26) bit value called T'<25:0> 901. This value is segmented into two thirteen (13) bit values called A'<12:0> 902 and B'<12:0> 903. In addition, there is a six (6) bit key value called K<5:0> 904 which is incremented from 0x00 to 0x3F. Each value of K 904 points to an Encrypt A' Table 905 and an Encrypt B' Table 906. Each of these tables contain a random arrangement of 8192 values between 0 and 0x1 FFF in which none of the values is repeated in the table. There are 8192! (factorial) ways of creating such tables and 128 of them have been selected at random; sixty-four for the Encrypt A' side and sixty-four for the Encrypt B' side. The values of A' 902 and B' 903 are used as the index into the table selected by K 904 presenting the contents at these indices of A<12:0> 907 and B<12:0> 908. These values together with each successive value of K 904 are presented to a bit combiner 909 to generate sixty-four (64) encrypted Tag ID values T<31:0> 910 which are stored into Tag 404. The operation of the bit combiner 909 is depicted in FIG. 10 where the bits from values A< >907, B< >908, and K< >904 are combined to form the encrypted Tag ID T<31:0> 910. The reader will recognize that there are more than 31! (factorial) ways in which this encrypted Tag ID value could be created from the component values and many other embodiments are possible.

Figure 11:
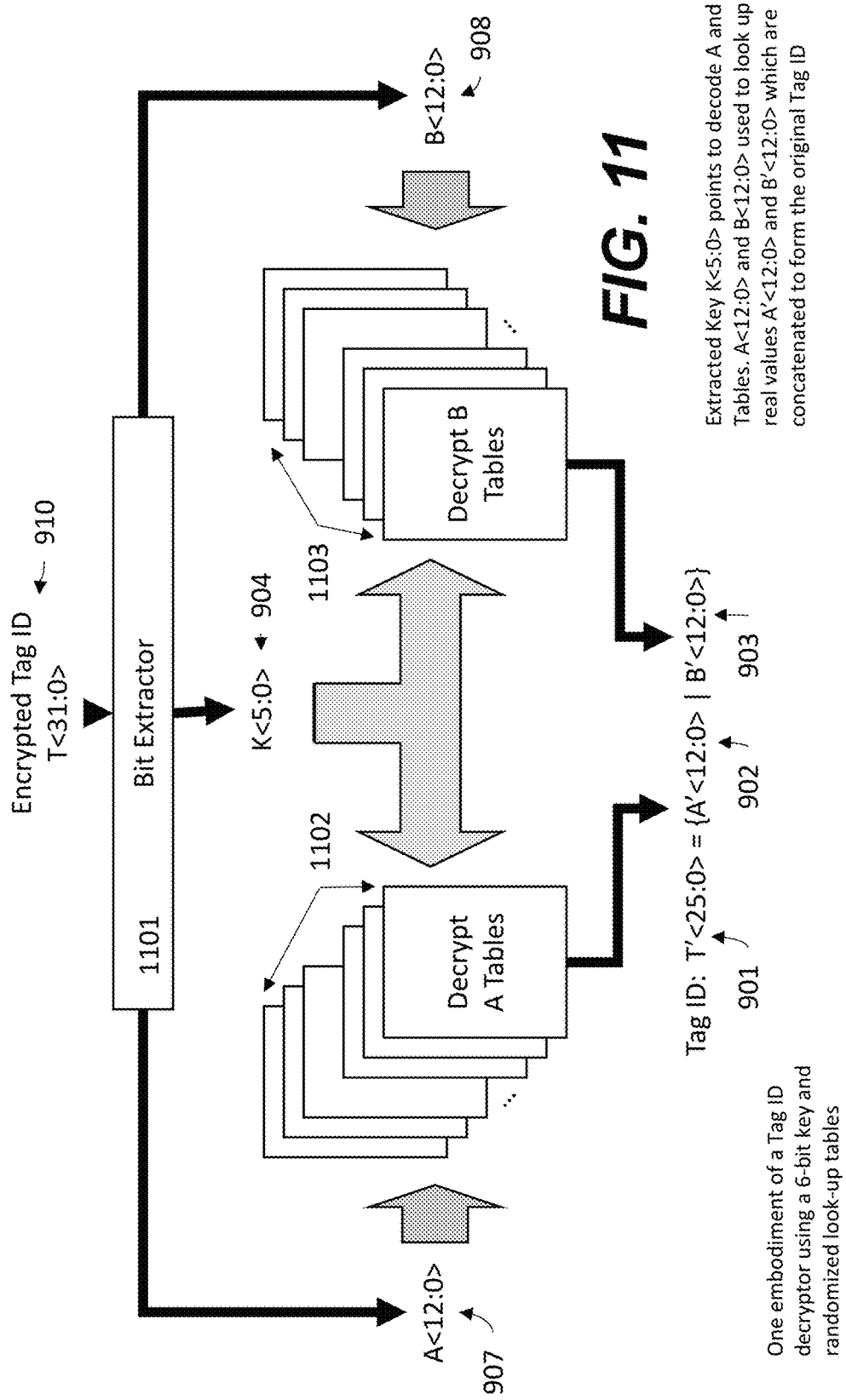
Figure 12:
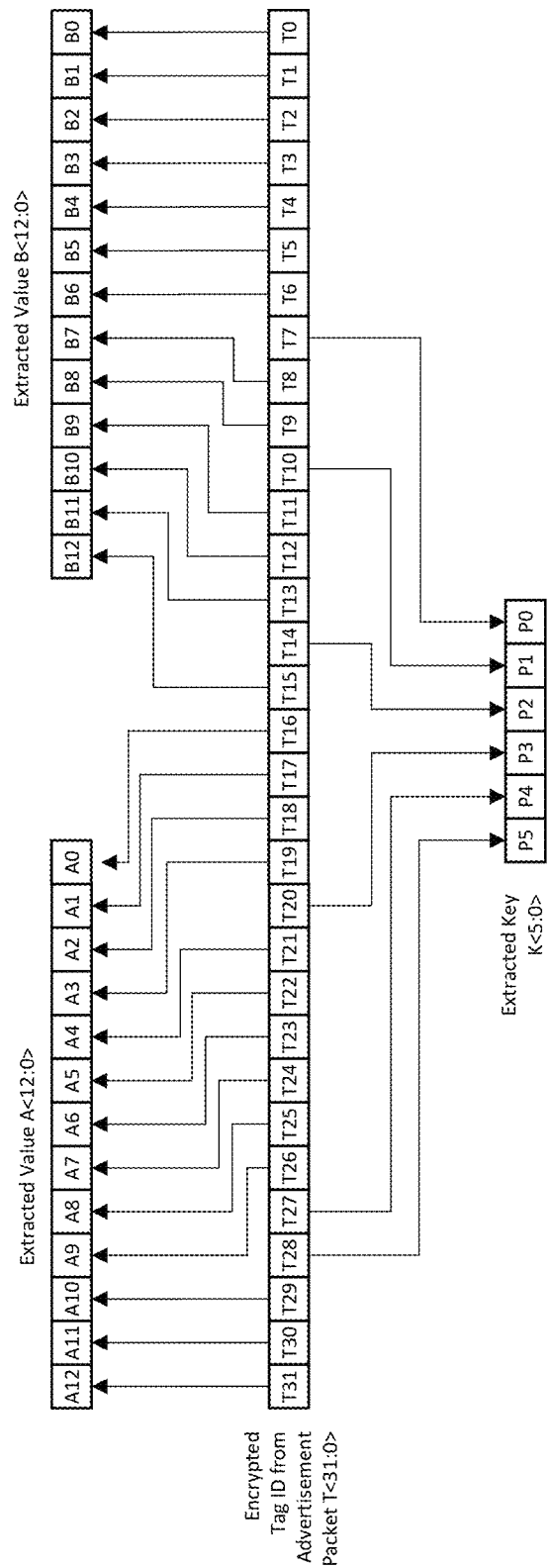

FIG. 11 and FIG. 12 depict show an embodiment of how an encrypted Tag ID 910 (and 801) is created using the algorithm described above, and can be decrypted. The encrypted Tag ID 910 is first extracted from the appropriate field 801 in the Advertisement packet 800. As shown in FIG. 11, the encrypted Tag ID 910 is applied to bit extractor 1101 to obtain the two encrypted values A<12:0> 907 and B<12:0> 908 together with the specific key K<5:0> 904. The value of K 904 is now used to select one Decrypt A Table 1102 and one Decrypt B Table 1103. The values of A 907 and B 908 are used as indices into these tables to look up the original values A'<12:0> 902 and B'<12:0> 903, respectively which are concatenated to form the original Tag ID T'<25:0> 901. The Decrypt A Tables 1102 and the Decrypt B Tables 1103 are the inverses of the Encrypt A Tables 905 and the Encrypt B Tables 906 for each value of K 904. That is to say they meet the following relationships:

Decrypt A((Encrypt A(N, K)), K)→N
Decrypt B((Encrypt B(N, K)), K)→N
where N∈{0, 1. 2, . . . , 8191}.

This represents simply one embodiment of encryption algorithms. Many other choices are also possible.

Figure 13:
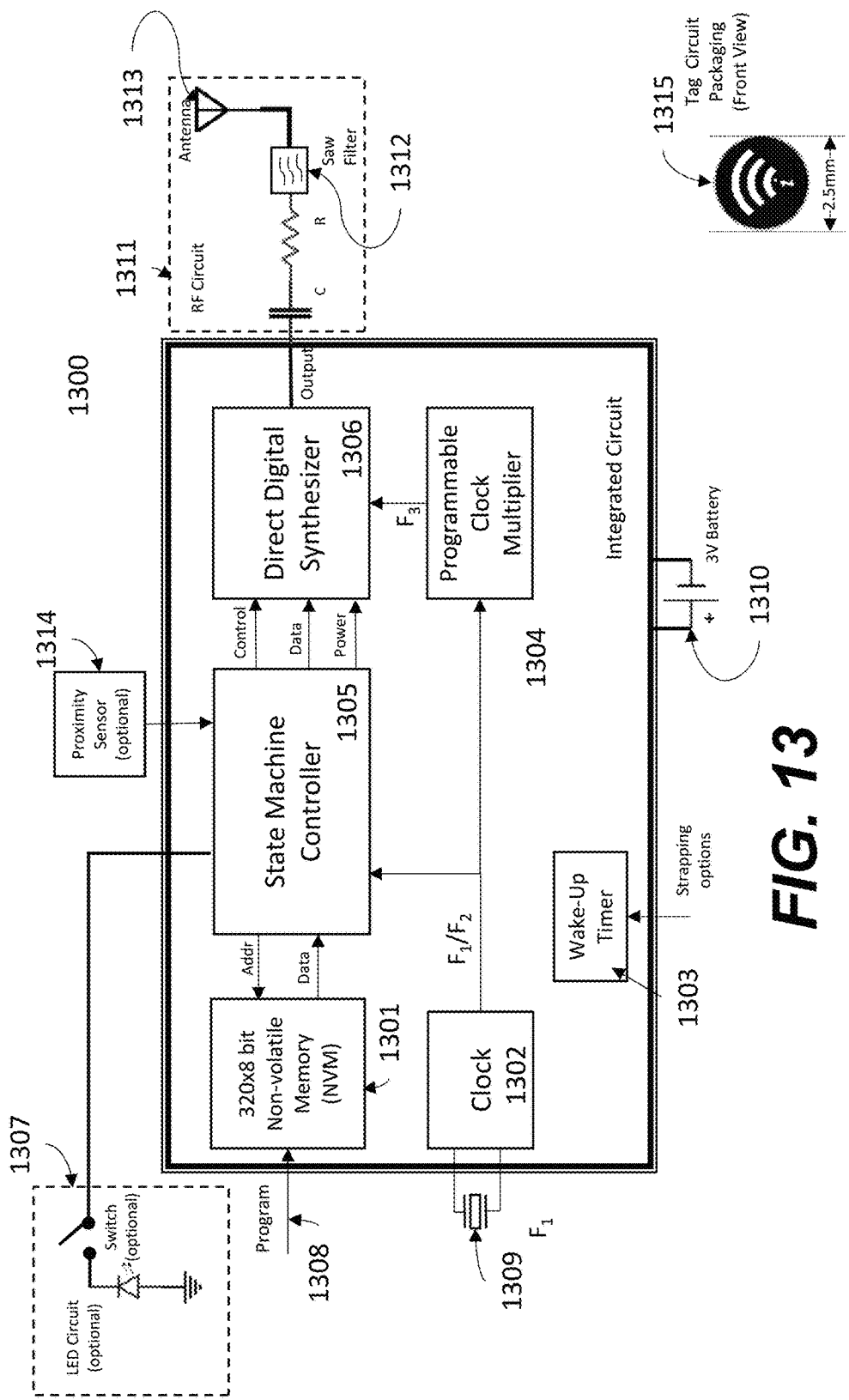
FIG. 13 shows a functional block diagram of a tag according to one embodiment of the present invention.

Referring now to FIG. 13, it shows a functional block diagram 1300 of a tag according to one embodiment of the present invention. The diagram 1300 may be better understood with reference to FIG. 14. A first unique aspect of the tag is that, because it is designed to only be detectable by a device (e.g., a smartphone) within one meter or so, its transmission power can be extremely low. In one embodiment, the transmit power measured at 1 meter distance is less than −90 dBm. This specific aspect allows for an entirely different design approach, called direct digital synthesis, to be used as compared to the generalized Bluetooth modem designs used in more complex integrated circuits. A second unique aspect of the tag is, as it is a broadcast only device, that no Bluetooth circuitry for reception is required.

Figure 4:
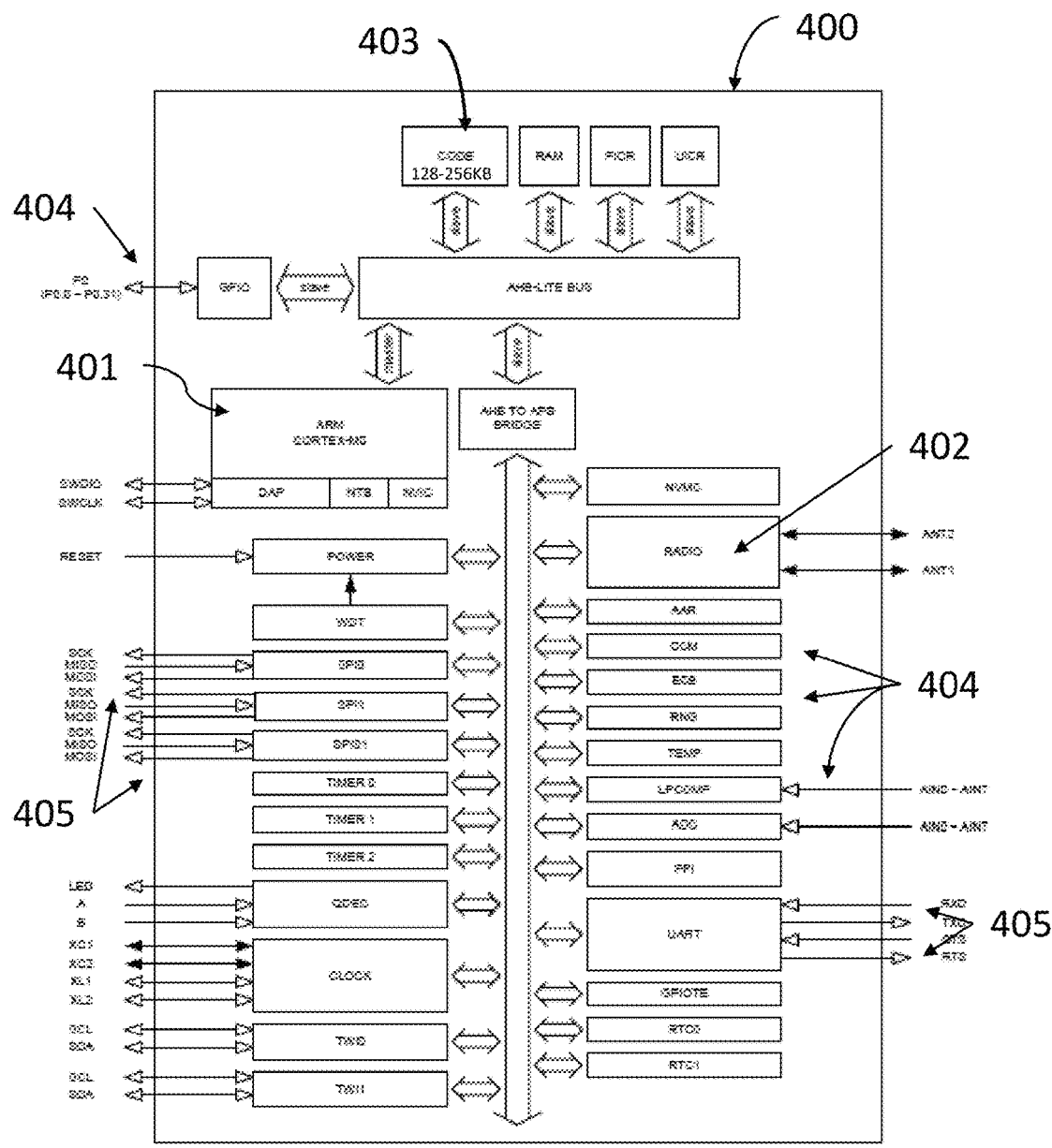
FIG. 4 shows a Bluetooth modem implementation as commonly used as a transceiver.

As a comparison, FIG. 4 shows a Bluetooth modem implementation as commonly used as a transceiver. It incorporates a full Bluetooth radio 402, a 32 bit ARM processor 401, a large number of digital input/output capabilities 403, and a number of specialized circuits for measuring environmental conditions or connections to analog sensors such as accelerometers 404. The design shown in FIG. 13 shows that there is no need for these items that are typically costly and consume a lot of power, which if used in a tag in the present invention would make it impossible to operate the tag on a battery power for an extended period (e.g., months).

Referring back to FIG. 13, a third unique aspect of one embodiment of the tag is that an Advertising event may include transmission of a single Advertising packet as allowed for by the BLE standards. This unique aspect reduces by one-third the current necessary to transmit packets as only one, rather than three packets are sent. A fourth unique aspect of one embodiment of the tag is that there are only sixty-four versions of the Advertisement packet 800. This is illustrated in FIG. 8. As seen octets 0 through 37 and 42 are fixed for all packets, there are sixty-four (64) different fixed patterns for octets 38 through 41, and octets 43 through 45 are calculated by circuitry. Hence one embodiment of the tag that has non-volatile storage for

[(37−0)+1]+[1]+[64*[(41−38)+1]]=295 octets is sufficient to hold all versions of the packet that need to be sent. This unique aspect can be contrasted with the complex integrated circuit 400 that require 128,000 to 256,000 octets of non-volatile storage 403.

As illustrated in FIG. 13, the design 1300 includes a number of blocks and other components. Without obstructing aspects of the design, only essential blocks are described herein in detail. A wake-up timer 1303 is provided to wake up other blocks or components periodically (e.g., every M milliseconds, wherein M can be set to 100 ms, 300 ms or 500 ms depending upon the specific strapping option). In one embodiment, it can be strapped externally from the integrated circuit 1300. Block 1302 is a clock circuit that provides multiple internal reference clocks $F_1$ and $F_2$ derived from external crystal 1309 operating at frequency $F_1$. Block 1301 is a 320×8 bit non-volatile memory that contains configuration of fixed and variable packet information. This non-volatile memory can be programmed using external signals 1308.

Block 1305 is a state machine controller that executes a number of functions. First, it activates the other blocks in the integrated circuit 1300 to enable the transmission of one or more Advertising packets. Second, it fetches configuration and packet data from the non-volatile Memory 1301, processes the data and presents them to the direct digital synthesizer block 1306. Included in this sequence is a variable wait time between 0 and 10 ms which randomizes the transmission of packets in accordance with the Bluetooth Low-energy standards. Third, it also contains digital circuitry for calculating the CRC value for a given transmitted packet and a "whitening circuit" as specified by the Bluetooth Low-energy standards. These standards-oriented capabilities are common and well known to those versed in the art and will not be further explained here. In addition, the state machine controller 1305 may optionally drive an LED circuit 1307 and make use of a proximity sensor 1314.

The direct digital synthesizer block 1306 synthesizes the correct signal waveforms based upon the data provided by the state machine controller 1305. This synthesized signal is presented to an external RF circuit 1311 which includes a saw filter 1312 and an antenna 1313. The direct digital synthesizer block 1306 uses a higher frequency clock $F_3$ which is derived from lower frequency clock $F_1$ by the clock multiplier block 1304.

An antenna 1313 can be implemented in any number of methods. One embodiment implements the antenna 1313 using the well-known "inverted F" printed circuit board structure with an underlying ground plane to insure that all RF energy is directed through the front of the Tag 404. Ideally, the integrated circuit 1300 is powered by one or more batteries 1310. All of the blocks are active only for a period of time determined by the state machine controller 1305 which is activated by the wake-up timer 1303.

The Integrated circuit 1300, crystal 1309, battery 1310, RF circuit 1311 and optionally LED circuit 1307 and proximity sensor 1314 are packaged on a small printed circuit board and installed in a plastic housing 1315. In one embodiment, the plastic housing includes an adhesive backing for attaching to a shelf, a fixture or a product.

Figure 14:
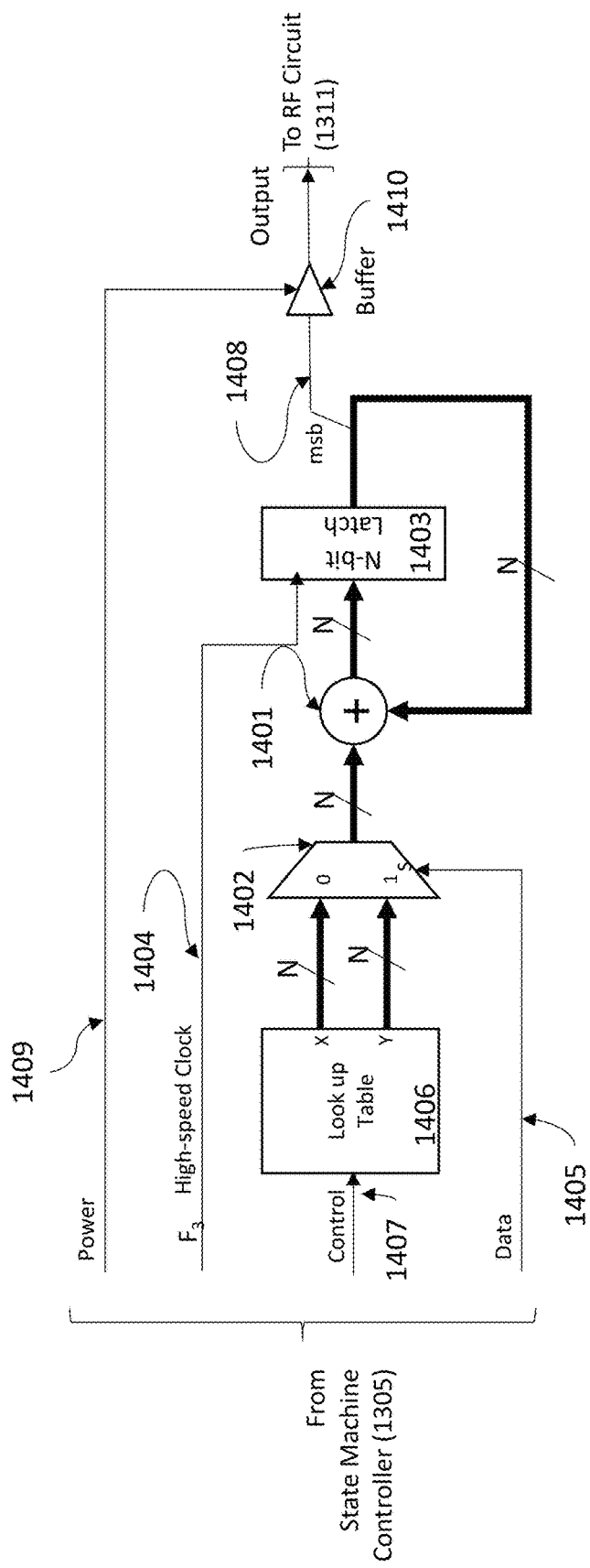
FIG. 14 shows a conceptual representation of direct digital synthesizer (DDS) that may be used in FIG. 13.

A conceptual representation of the direct digital synthesizer (DDS) is shown in FIG. 14. The central portion of the DDS is an N-bit accumulator 1401 that sums the values presented to it by a multiplexer 1402 and the previous accumulated sum from an N-bit latch 1403. This accumulated value is latched by the N-bit latch 1403 by transitions of the high-speed clock 1404 operating at a frequency $F_3$ that is provided by the clock multiplier 1304. The value presented to the N-bit accumulator 1401 from the multiplexer 1402 is selected by the value on the data signal 1405 which is presented to the DDS by the state machine controller 1305 described above. When a value on the data signal 1405 is '0', the N-bit value X is selected and presented to the N-bit accumulator 1401. When the value on the data signal 1405 is '1', the N-bit value Y is selected and presented to the N-bit accumulator 1401. The actual values of X and Y are determined by the frequency that one wants the DDS to output. The output 1408 is the most significant bit of the N-bit value stored in the N-bit latch 1403. This output 1408 is amplified through a buffer 1410 which has its output current regulated to a maximum defined by a two-bit power value, Power 1409, provided from the state controller 1305 and used to drive the RF circuit 1311.

Since the BLE signal uses frequency shift key modulation, a digital '0' is represented by one frequency and a digital '1' is represented by another frequency. So the value of X is chosen to synthesize the frequency corresponding to a digital '0' and the value of Y is chosen to synthesize the frequency corresponding to a digital '1'. The equations for calculating these values is as follows:

$$X=(F_{\cdot 0}-(M*F_3))/F_3*2^N \text{ and } Y=(F_{\cdot 1}-(M*F_3))/F_3*2^N$$

where:

$F_{\cdot 0}$ is the frequency corresponding to digital '0'
$F_{\cdot 1}$ is the frequency corresponding to digital '1'
N is the binary size of the values desired in bits
$F_3$ is the high-speed clock 1404
M is the harmonic of the high-speed clock 1404 that is being selected (the value and significance of M is described below).

The values of X and Y are stored in a look-up table 1406. The specific output pair of values (X, Y) selected from the look-up table 1406 is driven by the control signal 1407 from the state machine controller 1305. As the purpose of the design is to output Bluetooth Low-energy Advertisement packets on the Advertisement Channels 601, the pair values (X, Y) stored in the look-up table 1406 correspond to the frequencies shown in Table 1.

TABLE 1

Frequencies for BLE Indices used for Advertisement packets

| BLE Index | Frequency for '0' | Frequency for '1' |
|---|---|---|
| 37 | 2401.75 MHz | 2402.25 MHz |
| 38 | 2425.75 MHz | 2426.25 MHz |
| 39 | 2479.75 MHz | 2480.25 MHz |

Figure 15:
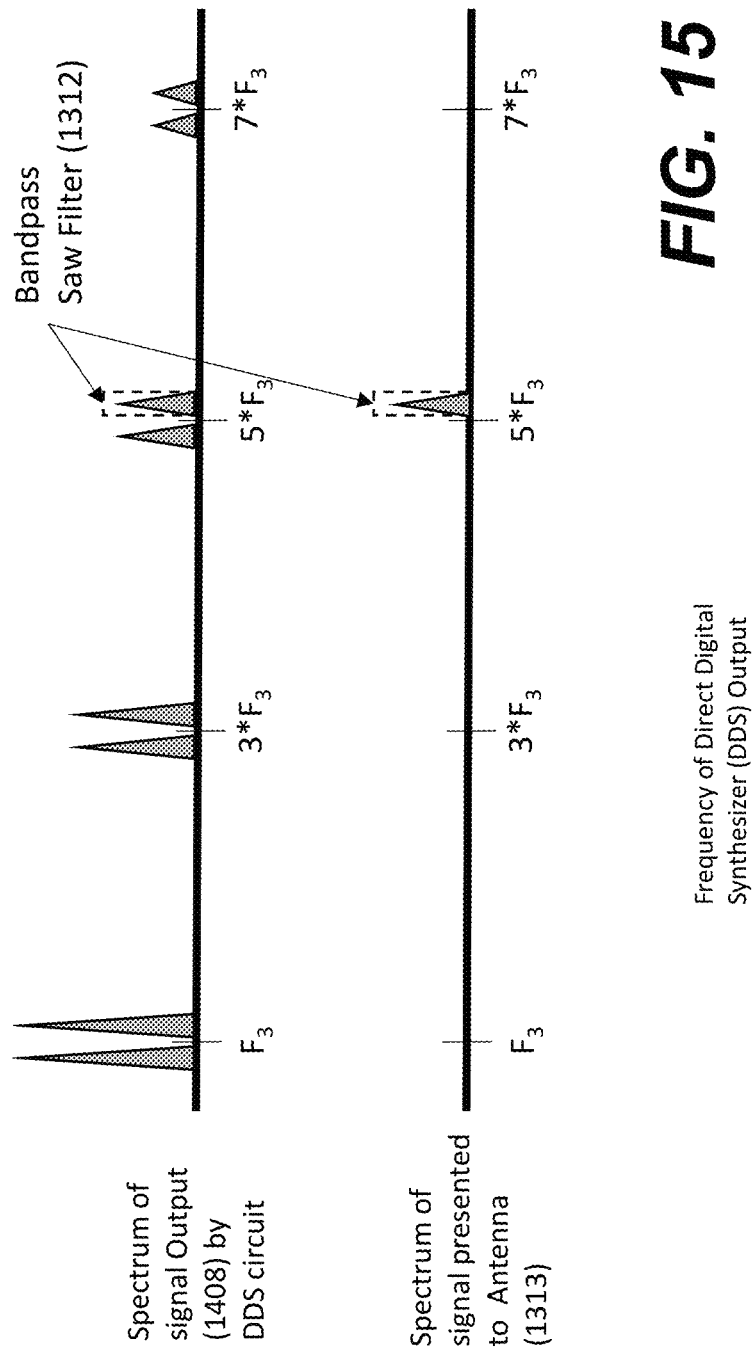
FIG. 15 shows an output from the Direct Digital Synthesizer (DDS), where a saw filter acts as a bandpass filter that filters out only the upper side of the spectrum around the fifth harmonic.

The frequency spectrum of the raw signal output 1408 can be quite complex. But in principle the output spectrum includes peaks that are equidistant on either side of the primary carrier frequency $F_3$. Since the output, at the digital level is either a 1 or a 0 that changes like the edges of a square wave, the spectrum around the primary carrier F3 is replicated at a smaller amplitude at the odd harmonics $3*F_3$, $5*F_3$, ... etc... Using a saw filter 1312 one of these spectral images can be filtered out and presented to the Antenna 1313 as a single frequency. This is illustrated in FIG. 15 where the saw filter acts as a bandpass filter that filters out only the upper side of the spectrum around the fifth harmonic. In other words, for the diagram in FIG. 15, M=5.

As seen, the N-bit accumulation function performed by the conceptual DDS shown in FIG. 14 is completely predictable if the starting value of the accumulator latch 1403, the value of the Data 1405, and the value of the Control 1407 are known. Furthermore, while there are 2^N possible starting values, a small subset of these could be preselected and provide the best behavior as the value of Data 1405 transitions from 0 to 0, 0 to 1, 1 to 0, or 1 to 1. Hence another embodiment of the DDS is to fetch a pre-calculated sequence of Output values 1408 based upon the last Data 1405 value and the current Data 1405 value and shift this sequence through buffer 1410 using High-speed Clock F3 1404. In this case instead of implementing an accumulator, these pre-calculated sequences would be store in read-only memory.

The significance of this approach cannot be understated. First, for a typical Bluetooth radio 402 of FIG. 4, the frequency synthesis must operate at the Bluetooth frequencies between 2400 MHz and 2482 MHz. These are very high frequencies that require analog integrated circuit technologies. Since this Bluetooth Radio 402 is combined with digital logic such as an ARM processor 401, such an approach requires a customized mixed-mode integrated circuit fabrication facility. In comparison, the design of the tag in FIG. 13 and outlined above is a completely digital circuit that can be fabricated on the most common, low-cost digital fabrication line. Second, as the power consumption of integrated circuits is linearly proportional to the switching frequency, the ability to select the $M^{th}$ harmonic, means that the digital logic consumes $1/M^{th}$ of the power. Third, the number of components operating at the highest frequency $F_3$ is very few. In another embodiment, the DDS circuit depicted in FIG. 14 can perform the accumulation function in parallel operating at a frequency $F_3/4$ and use a SERDES at the output to further reduce the number of components operating at the highest frequency. Fourth a workable, lowest power design includes selecting the right values for N, $F_3$ and M, as the advertisement frequencies for '0' and '1' are specified by the Bluetooth standards.

In one embodiment, a tag is a direct digital synthesizer, where N=10, M=5, $F_3$=950 MHz, 1000 MHz, and 1025 MHz to generate signals for Channels 37, 38, and 39, respectively, a saw filter covering 2400 to 2490 MHz is used and the accumulator 1401 and the latch 1403 circuitry is implemented as four parallel slices. Other design choices are also possible.

In one embodiment, the design of the state machine controller 1305 is illustrated in FIG. 16 through FIG. 19(*d*). This embodiment implements a memory assignment of the 320×8 bit Non-Volatile Memory (NVM) block 1301 as depicted in FIG. 16. As shown the fixed octets of the Advertisement Packet 800 (see FIG. 8) are stored in NVM 1301 locations 0 through 38. The desired RF power level at which an advertisement packet 800 should be transmitted is stored in location 39. This is a two-bit value selecting up to four power levels. In one embodiment, these values specify: 00: Transmit at −15 dBm, 01:Transmit at −20 dBm, 10: Transmit at −30 dBm, 11: Transmit at −40 dBm. The sixty-four (64) different values for the encrypted Tag ID 801 are stored in NVM locations 64 through 319. In addition certain configuration values used by the state machine controller 1305 are stored in NVM locations 40 through 43. These configuration values are defined in table 2 and table 3 below.

TABLE 2

Configuration Parameters

| NVM Location | Name | Description |
|---|---|---|
| 40 | ConfigFlags | Configuration flags defined in table 3. |
| 41 | LedOnDuration | Number of Advertisement cycles that the LED should be turned on. |
| 42 | LedOffDuration | Number of Advertisement cycles that the LED should be turned off. |
| 43 | EncryptPageDuration | Number of Advertisement cycles ÷ 256 that a given encrypted Tag ID should be used before incrementing to the next value. |

TABLE 3

ConfigFlags Detail

| Bit Position | Name | Description |
|---|---|---|
| 0-1 | PacketPerCycle | Set to '00' if special low-power mode is to be used<br>Set to '01' if packet sent on BLE channel 37<br>Set to '10' if packet sent on channels 37 and 38<br>Set to '11' if packet sent on all three channels |
| 2 | LedEnable | Set to '1' if an LED circuit is present. |
| 3 | ProximityEnable | Set to '1' if a Proximity Sensor is present |
| 4 through 7 | n/a | Not Used |

In this embodiment, the state machine controller 1305 executes a set of steps necessary to transmit one to three advertisement packets 800 at regular intervals defined by the wake-up timer 1303. The state machine controller 1305 has several state variables that it must maintain. These are:

LED_CTR: An eight bit down counter that is used to time the on and off durations of the LED, if it is enabled.

LED_STATE: A single bit state that is used to indicate if the LED is currently on or off.

ENCRYPT_PAGE: A six bit up counter that holds the current value of K, the index for the stored encrypted Tag ID.

ENCRYPT_CTR: A sixteen bit counter used to measure the length of time left for the current ENCRYPT_PAGE to be used.

INDEX_CTR: The index indicating what frequency should be used when transmitting an Advertisement Packet. This is presented to Direct Digital Synchronizer 1506 on Control lines 1407.

All of these state variables are initialized to 0 on power up. In addition there are two other counters used by state machine controller 1305 that are not preserved between Advertisement Events. These are:

PKT_CTR: A down counter the number of Advertisement Packets that should be sent for this Advertisement Event.

ADDR_CTR: A counter used to sequence through the octets of the Advertisement Packet for transmission.

CRC: This is twenty-four one-bit registers used to calculate the CRC for the packet being transmitted.

WHITNER: This is seven one-bit registers used to whiten the output bit stream.

FIG. 17(*a*) through FIG. 17(*c*) shows a flowchart for the execution of the state machine controller 1305 according to one embodiment of the present invention. The first action of the state machine controller 1305 is to set the Wake-up Timer [1701] then shut down and wait for this time to expire. When the timer expires, an additional random wait interval is inserted to be in accordance with the Bluetooth specification. At the expiration of this timer, the state machine controller 1305 fetches the configuration parameters from the Non-volatile Memory 1301 at 1702.

If the PacketPerCycle value is non-zero, it is initialized to the PKT_CTR value from the configuration while the INDEX_CTR is cleared. Otherwise, the PKT_CTR is set to '1' and the INDEX_CTR is incremented modulo 3 at 1703. This special mode where PacketPerCycle is zero implements one embodiment where there is only one Advertisement Packet per Advertisement Event, however, each of the three Advertisement channels (e.g. indices 37, 38, 39) are used sequentially.

The next set of shaded logic at 1704 operates to flash an LED on or off by counting down the off or on duration using counter LED_CTR and the configured values LedOffDuration and LedOnDuration, respectively. If ProximityEnable is set to '1' then a test at 1705 to see if a proximity sensor 1314 of FIG. 13 detects the presence of a mobile device is performed. If no device is present, then no packets are sent and the cycle completion logic described below is executed.

For clarity of description, it is assumed that LEDEnable and ProximityEnable are set to '0' so the ADDR_CTR is cleared, the CRC and WHITNER bits are initialized, the Clock Multiplier is set to either 950 MHz, 1000 MHz or 1025 MHz as specified by INDEX_CTR. [1706]. In addition, the RF transmit power level is fetched from NVM 1301 location 39 (see FIG. 16) and provided to the direct digital synthesizer 1306 at 1706. In accordance with the Bluetooth standard, the CRC bits are initialized to alternating 1s and 0s where the first bit is set to 1 and the $24^{th}$ bit is set to 0. Also in accordance with the Bluetooth standard, the WHITNER bits are initialized to the binary value of the BLE index that is being used. So for example, if the BLE index is for channel 37 represented as 0100101 in binary, the first bit of the WHITNER is set to 1, the second to 0, the third to 1, the fourth bit to 0, the fifth bit to 0, the sixth bit to 1 and the seventh bit to 0. The channel being used is captured by the state variable INDEX_CTR where '00' means channel index 37, '01' means channel index 38, and '10' means channel index 39.

As depicted in FIG. 17(*b*) and the value of ADDR_CTR is tested as a large "case statement" at 1707. Depending upon the value of this counter, different steps are performed as described below:

If ADDR_CTR is less than 5, the contents of the NVM 1301 stored at the address location of ADDR_CTR are fetched and transmitted one bit at a time beginning with the least significant bit at 1708. This is because neither the preamble nor the Access Address should be whitened or used in the CRC calculation. Upon the transmission of each bit of an octet, ADDR_CTR is incremented at 1718 and re-evaluated as a "case statement" at 1707.

If ADDR_CTR is between 5 and 37 inclusive, the contents of the NVM 1301 stored at the address location of ADDR_CTR are fetched and transmitted one bit at a time beginning with the least significant bit [1709]. However, in this case, each bit is also input to the CRC and applied to the WHITNER before being presented to direct digital synthesizer 1306. Upon the transmission of each bit of an octet, ADDR_CTR is incremented at 1718 and re-evaluated as a "case statement" at 1707.

If ADDR_CTR is between 38 and 41 inclusive, the encrypted Tag ID is fetched from NVM 1301 based upon the ENCRYPT_PAGE state variable. Each of these octets are transmitted one bit at a time beginning with the least significant bit through the WHITNER to the direct digital synthesizer 1306 at 1710, 1711, 1712, and 1713. Each of these bits are also presented to the CRC calculation registers. Upon the transmission of each bit of an octet, ADDR_CTR is incremented at 1718 and re-evaluated as a "case statement" at 1707.

If the ADDR_CTR is 42, then the contents of NVM location 38 are fetched can presented to CRC, WHITNER and DDS 1306 as above at 1714. Upon the transmission of each bit of an octet, ADDR_CTR is incremented at 1718 and re-evaluated as a "case statement" at 1707.

If ADDR_CTR is between 43 and 45, inclusive, then each octet of the CRC calculation are fetch where CRC_0 is an octet comprising bits 1 through 8 of the CRC registers where bit 1 is the least significant bit of CRC_0, CRC_1 is an octet comprising bits 9 through 16 of the CRC registers where bit 9 is the least significant bit of CRC_1, and CRC_2 is an octet comprising bits 17 through 24 of the CRC registers where bit 17 is the least significant bit of CRC_2. Each of these octets are shifted out, one bit at a time beginning with the least significant bit and applied to the WHITNER before being presented to DDS 1306 at 1715, 1716, 1717. Upon the transmission of each bit of an octet, ADDR_CTR is incremented at 1718 and re-evaluated as a "case statement" at 1707.

Figure 17A:
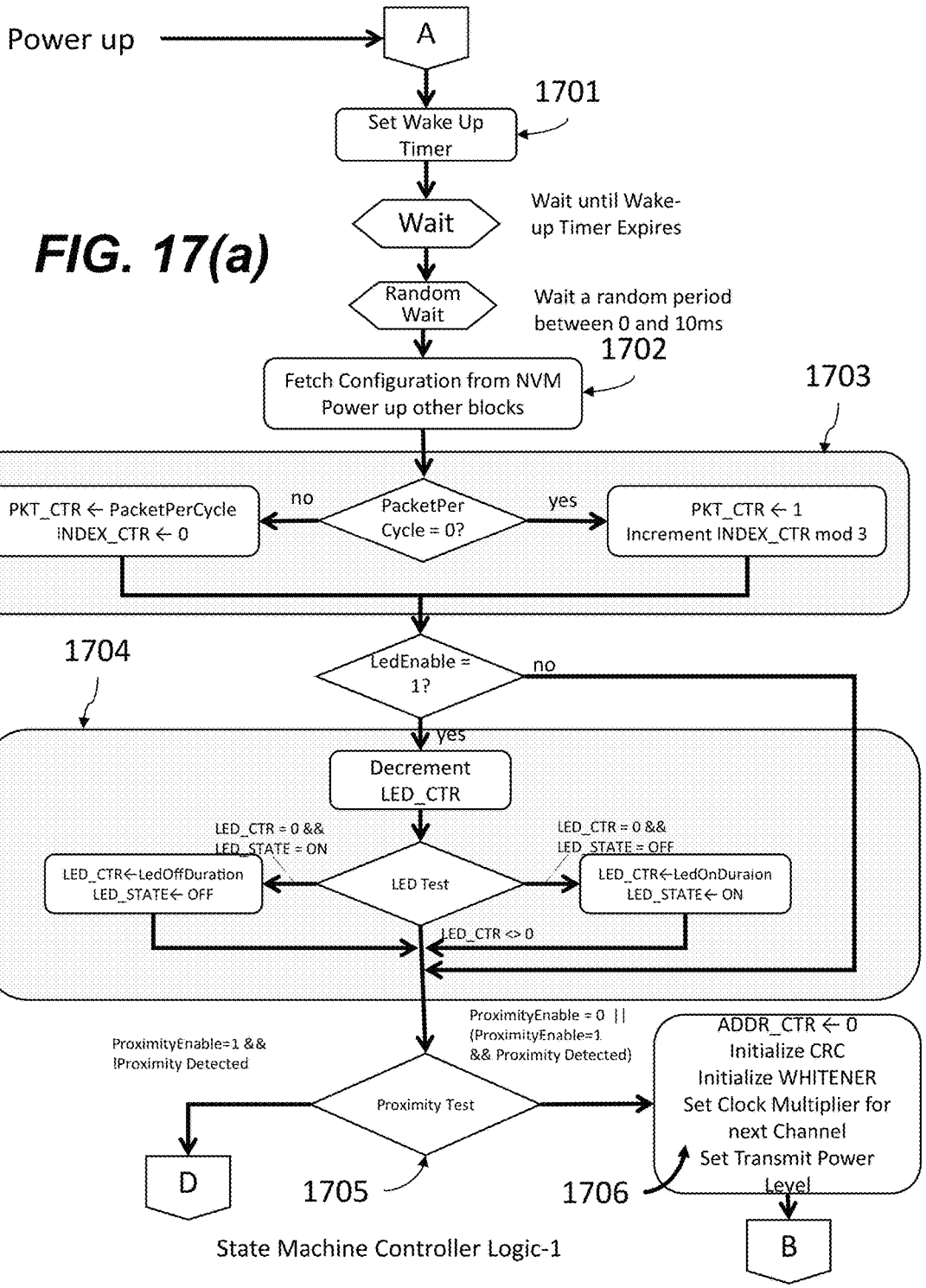
Figure 17B:
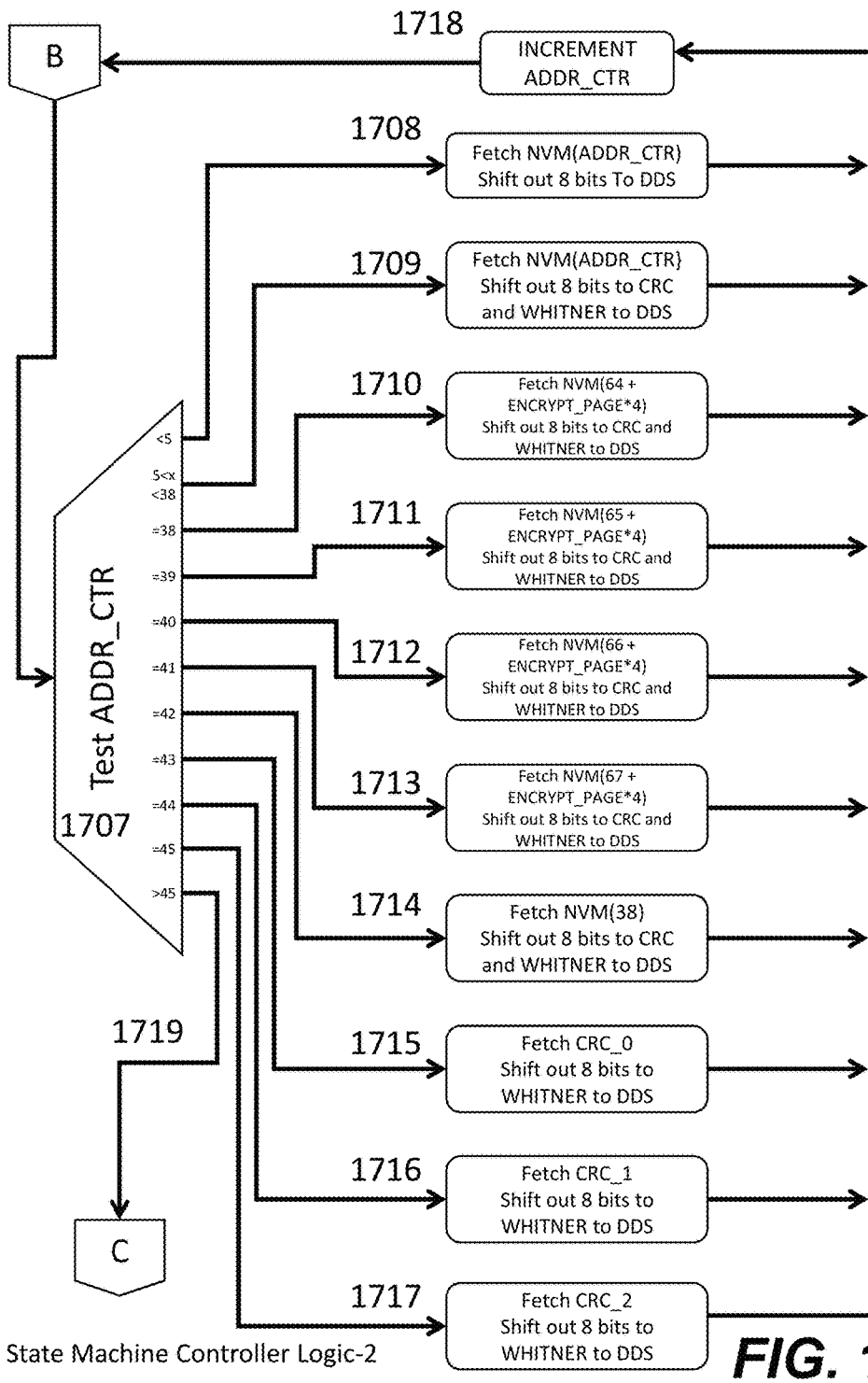
Figure 17C:
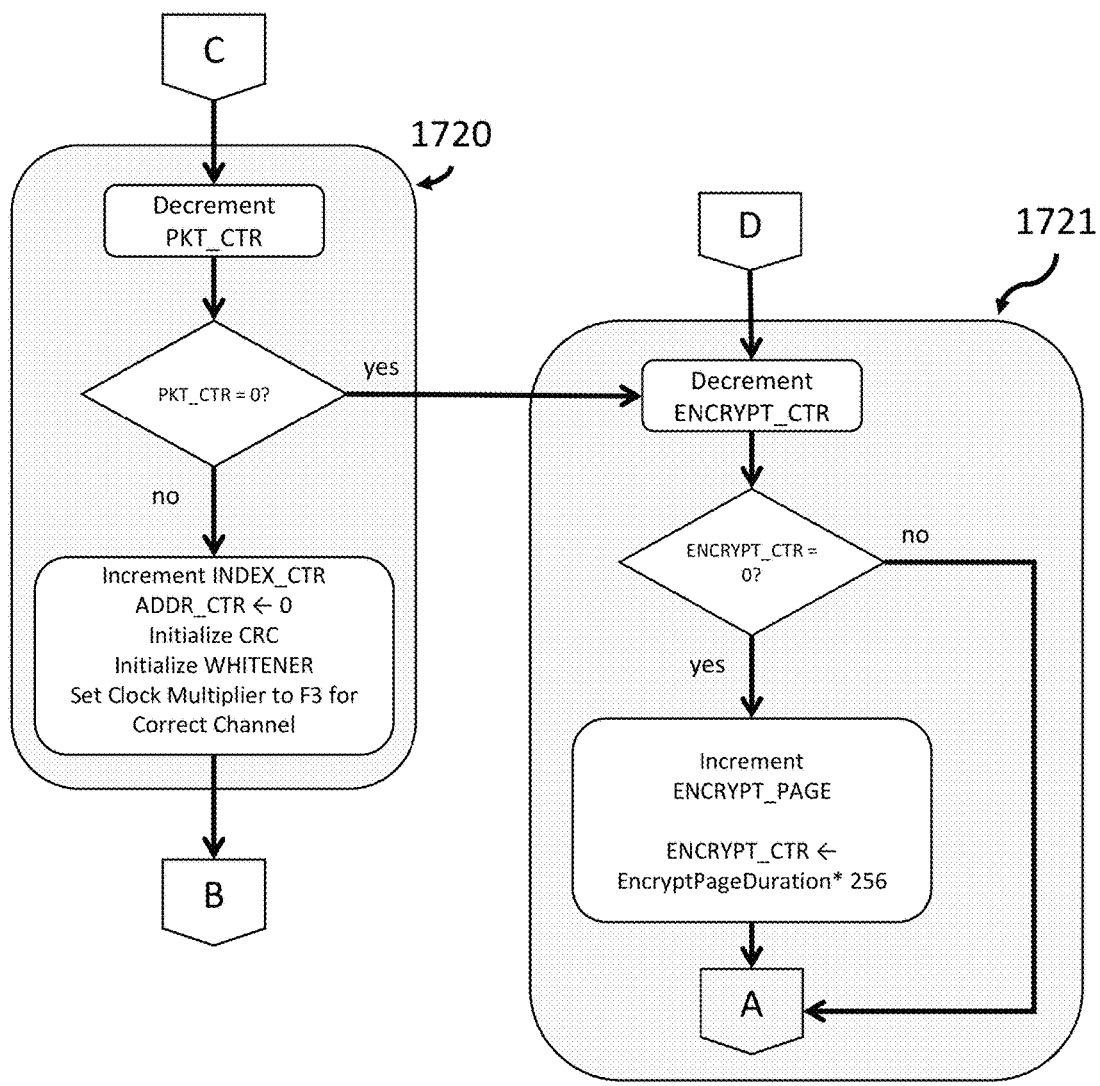

If ADDR_CTR is greater than 45, then the packet transmission is complete and flow moves to the steps outlined at 1719 in FIG. 17(c).

As depicted in FIG. 17(c), once a packet has been transmitted, the PKT_CTR is decremented. If this counter is non-zero, then there are still more packets to be sent. The INDEX_CTR is incremented to point to the next transmission frequency, the Clock Multiplier is updated for the next frequency, ADDR_CTR is cleared, CRC and WHITNER registers are initialized and the logic flow returns to FIG. 17(b) as described above [1720]. If the counter is zero, then the countdown counter ENCRPYT_CTR is decremented and tested to determine if it is time to move to a new encrypted Tag ID value. If the ENCRYPT_CTR is non-zero, then this test if false and control returns to the top of FIG. 17(a), step 1701. If however, it is zero, then the test is true and the ENCRYPT_ PAGE which points to next value of encrypted Tag ID is incremented and the ENCRYPT_CTR is re-initialized to the EncryptPageDuration value stored in the configuration multiplied by 256 before the control returns to the top at 1721 in FIG. 17(a).

The particular tag design described in the preceding paragraphs represent one of a number of ways such a design could be implemented. The particular embodiment does not preclude design approaches where advertisement packets of different formats, content, and RF transmit power levels are transmitted, nor approaches where different choices of BLE transmit frequencies are selected.

As described above with respect to FIG. 2 and FIG. 3, the installed module 314 of FIG. 3 operating on a device is designed and configured to work with the micro-proximity tag services being offered via the server 201. Depending on implementation, there are two types of functionality that may be incorporated in the module 314: tag reader functionality and tag writer functionality. The tag reader functionality facilitates a device to detect a tag when it is moved within the proximity of the tag and reports the detection to the tag services. The tag writer functionality facilitates a device to assign a tag to a tag action that has been previously defined by a service provider, a client, or a third-party using the tag services. As described above, such assignment could be performed via an appropriate portal. However, there are operational simplicities that result from being able to make this assignment after a tag has been placed.

Figure 18A:
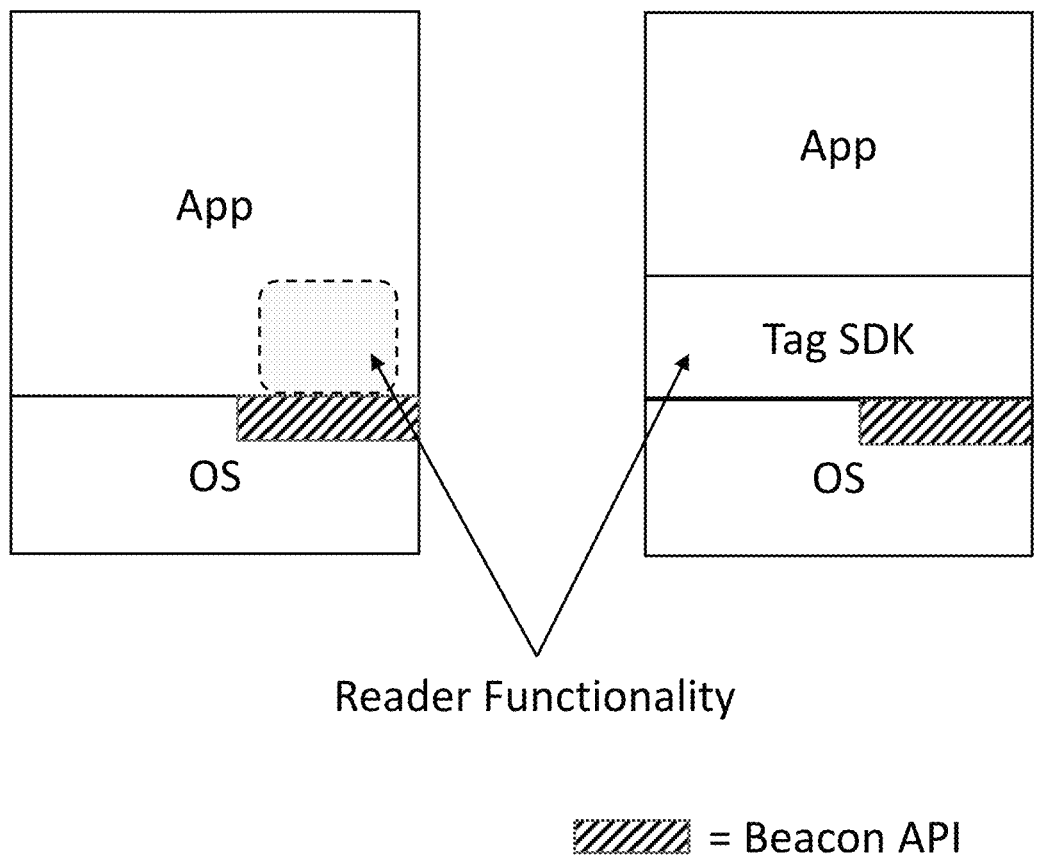
Figure 18B:
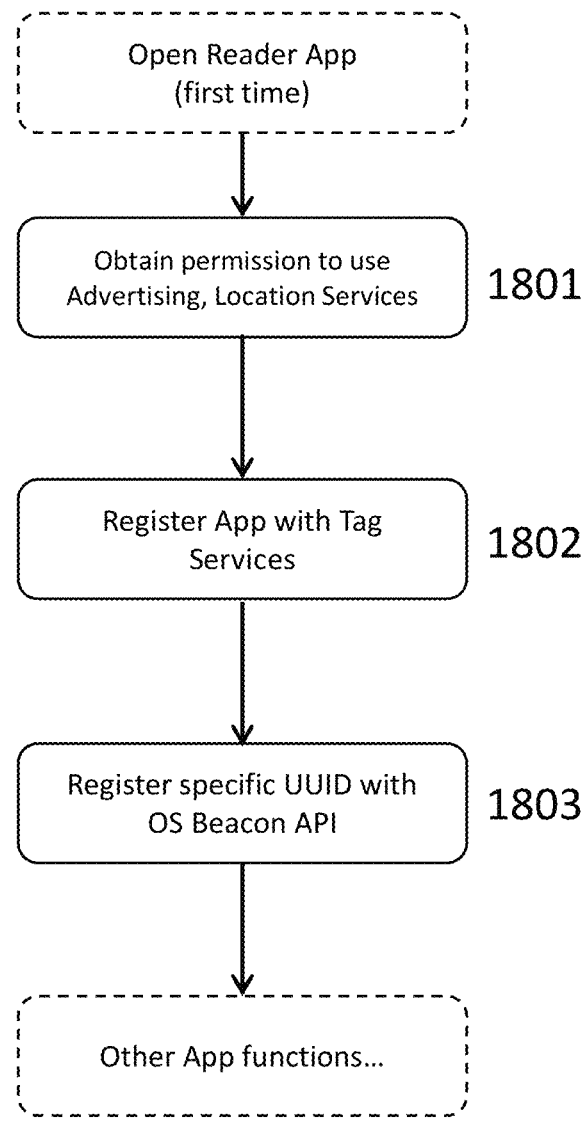
Figure 18C:
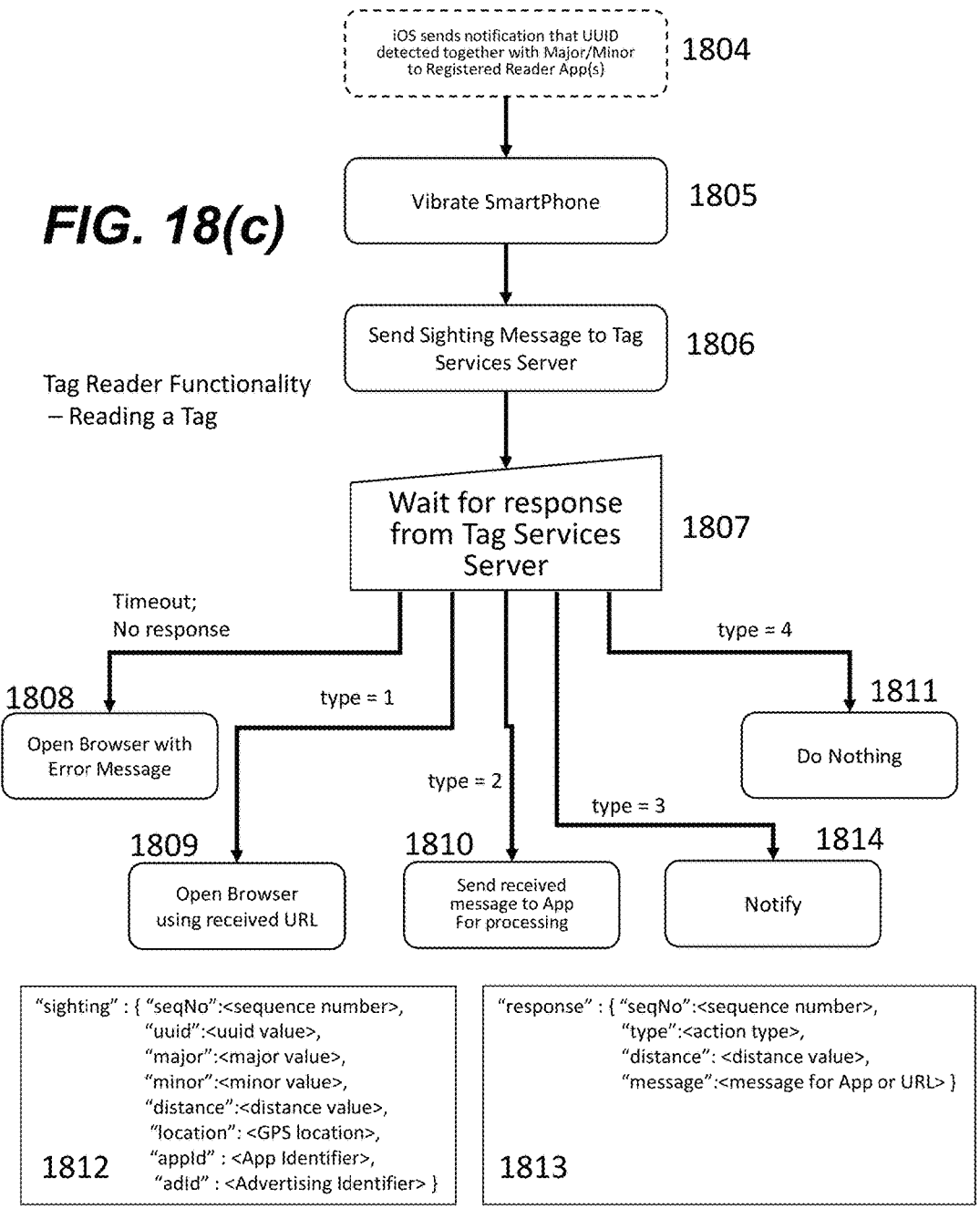

One embodiment of the tag reader functionality is depicted in FIG. 18(a) through FIG. 18(c). FIG. 18(a) depicts two approaches in which the tag reader functionality can be implemented as part of the module 314 of FIG. 3. In both approaches, the module 314 runs on top of an Operating System (OS) in the device 300 in FIG. 3. The OS provides access to the Bluetooth hardware the device 300. Access to the hardware is enabled and controlled by use of an Applications Programming Interface (API). In one embodiment, this API is a "Beacon API" and provides the ability for the module 314 to register to be notified when any iBeacon formatted advertisement packet is received by the device 300, matching the UUID of a specific tag service provider and thus conveying the contents of the Major 716 and Minor 717 fields which contain the encrypted tag ID.

In a related embodiment, the Beacon API provides distance information between a tag and a device in addition to the Major 716 and Minor 717 fields. Using one approach the tag reader functionality is embedded directly into the module 314 which interfaces to the OS using the Beacon API. Using a second approach, the tag reader functionality is implemented as a tag Software Development Kit (SDK). In this approach, the module 314 is not directly connected to the Beacon API but only indirectly as part of importing the SDK. In this case the SDK implements the tag reader functionality. These two approaches are depicted respectively in FIG. 18(a).

FIG. 18(b) shows an exemplary start-up sequence for the client module to be used for the first time, where the install module implements the tag reader functionality. The first time the App 406 is invoked several steps must be executed. First it must secure the Smartphone 405 user's permission to utilize various services such as: advertising and tracking services, location services, and network services at 1801. Second, the App 406 must register itself with the tag services 419 over communication channel 501 at 1802. Thirdly, it must register the Service Provider's UUID with the Smartphone's 405 OS at 1803. Once these steps are complete, the App 406 is enabled to read Tags 404.

FIG. 18(c) shows a process or flowchart of how a tag is read according to one embodiment of the present invention. Depending on implementation, the process may be implemented in software or in combination of both software and hardware. Depending on where a device is located, the client module in the device may be active or inactive waiting for the OS there to activate it. When the device is in the vicinity of a tag and receives one or more broadcasting packets (e.g., Advertising Packets matching the UUIP of a service provider), the OS notifies the client module and passes 2 sets of octets (e.g., the Major identifier 716 and the Minor identifier 717 of FIG. 7) at 1804. If deployed on a mobile type, the device is caused to vibrate by the tag reader functionality in the client module at 1805. In responding to the detection of the presence, the device is caused by the client module to send a "sighting" message to the tag services via a sever at 1806.

According to one embodiment, a "sighting" message, showed as an example 1812, is a JSON object containing a unique sequence number created by the tag reader functionality to be used in any response message so that "sighting" and "response" can be matched. In the example shown in FIG. 18(c), the "sighting" or message ID includes the UUID of the tag, the Major identifier and the Minor identifier values which contain the encrypted Tag ID, and a distance of the device is seeing the tag which is calculated by the client module (or the SDK therein) by comparing the received signal strength of the broadcast from the tag with a reference (e.g., the Tx Power value 805) which represents the calibrated signal strength that should be measured if the device is a certain distance (e.g., 1 meter) away from the tag. In addition, the message ID includes the GPS location of the device, an identifier of the client module and the Advertising Identifier of the mobile device. The identifier of the client module is provided to the user who chose to install the module in his device (e.g., in his iPhone 6) and to incorporate the tag reader functionality for the micro-proximity tags. The GPS and Advertising Identifier values are available from the OS. The GPS location of the tag is typically defined when the tag is registered with the service server. The GPS value in the message identifier 1812 is used by the tag services to determine if the tag has been moved. Once the message identifier 1812 has been sent, the tag reader functionality waits for a response message at 1807.

In this depicted embodiment of FIG. 8(c), if the device is a mobile type, the responses could be:
  A timeout at 1808 and an error message is presented to the user,
  A directive at 1809 to open a browser pointed at a particular URL,
  A directive at 1810 to send a received message to the client module for processing, or
  A directive at 1811 to do nothing.
  A directive at 1814 to notify the tag services per the distance.

FIG. 18(c) also shows a suitable "response" message, it is the JSON object depicted as 1813. It includes a sequence number that is sent in the original "sighting" message, a type field indicating which of the above actions at 1809, 1810, 1811 or 1814 should be executed, and a message field to convey textual information to the client module whose meaning is dictated by the type field.

When a distance parameter is included in the response message. In the cases of actions at 1809 and 1810, the presence of a distance value directs the client module (or the SDK therein) to take the action only when the device is moved to a distance less than or equal to the distance value in "response" message 1813 from the tag. In the case of 1814, the presence of the distance value indicates that the client module (or the SDK therein) should notify the tag services when the device is a distance greater than the distance value in "response" message 1813 from the tag.

Figure 19B:
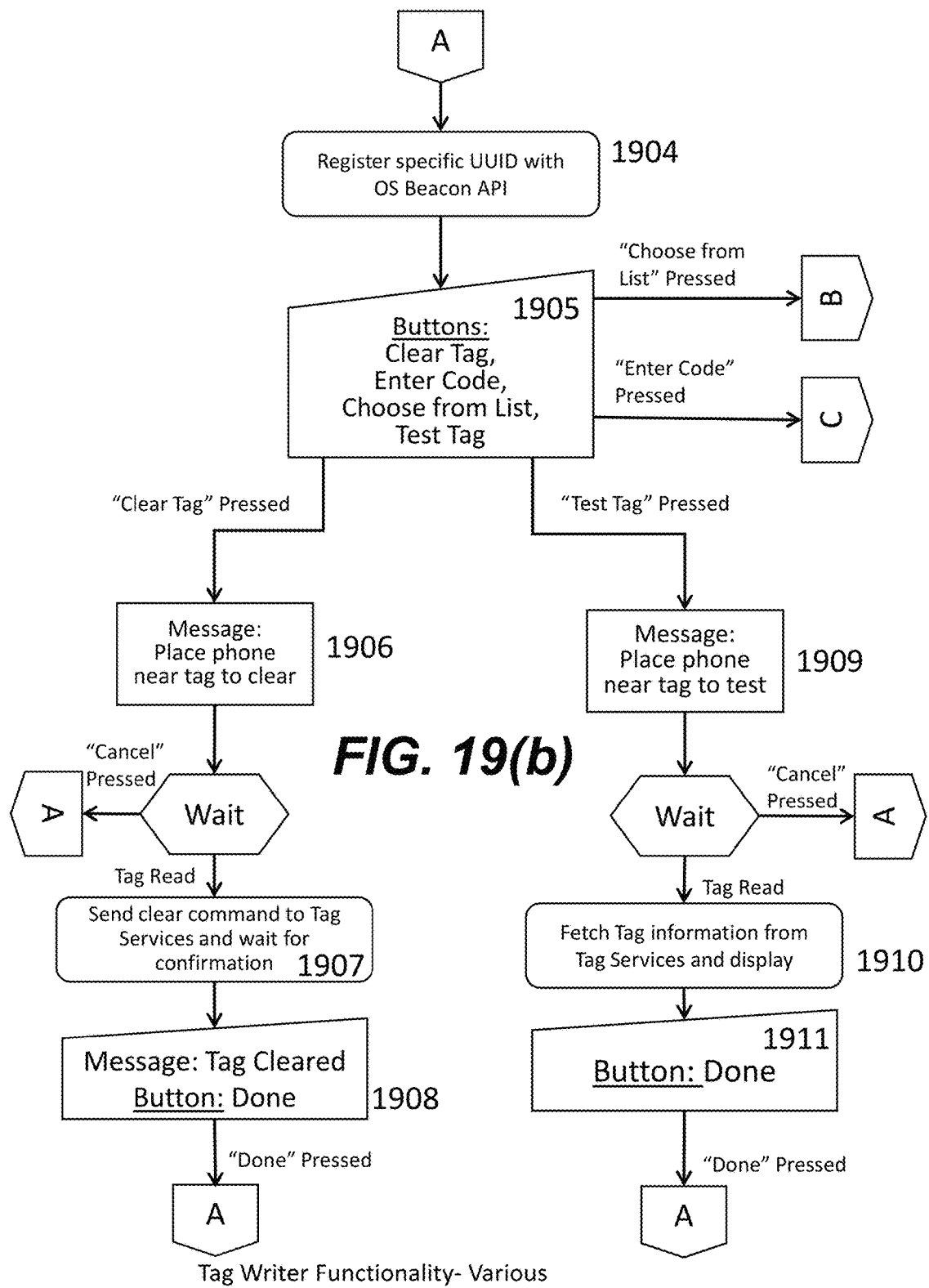

FIG. 19(a) through FIG. 19(d) show collectively a process or flowchart of performing tag writer functionality according to one embodiment of the present invention. As described above, "tag writing" constitutes assigning a tag action to a given tag 404 and in general is applicable to a mobile device. Unlike the tag reader functionality, the tag writer is performed by agents of a client or a third-party. Hence a specific application or the client module with the tag writer functionality is designed to fulfill the functions. Similar to the tag reader functionality, the tag writer functionality uses the OS in the device and Beacon API. FIG. 19(a) shows the start-up sequence for the first time as a tag writer. The writer shall register itself with the tag services at 1901. Since only authorized agents should be performing this function, credential information must be entered or exchanged and validated at 1902. Once this validation is complete, the client module must be signed in with the tag services at 1903.

At this point, the writer is registered with the OS to receive the UUID of a specific service provider at 1904 in FIG. 19(b). The user is provided with a number of choices for writing a tag. As shown in FIG. 19(b), the user can at 1905:
  "Clear a tag"; that is un-assign a tag from its current tag action,
  "Choose from list", where the tag action to be assigned to a tag is selected from a list of options,
  "Enter a Code", where a code is entered by an agent or a user, and this code is used to determine the tag action to be assigned to the tag, or
  "Test a Tag" to see if it is working properly and what the tag action is assigned.

If the "Clear a Tag" function is selected, a message is displayed telling the user to place the device close to the tag at 1906. The writer then reads the Tag's Major and Minor fields sent from the OS and forwards these together with a "Clear Tag" command to the tag services over at 1907. Once a response is received from the tag services indicating the operation is complete, a message is displayed to the user at 1908 and the sequence is completed.

If "Test a Tag" function is selected, again a message is displayed prompting the user to place his device close to the tag 404 at 1909. Now the Tag information is read at 1910 just as the tag reader functionality described above. The user may verify that operation was successful by pressing a designated button (e.g., a Done button) at 1911.

Figure 19C:
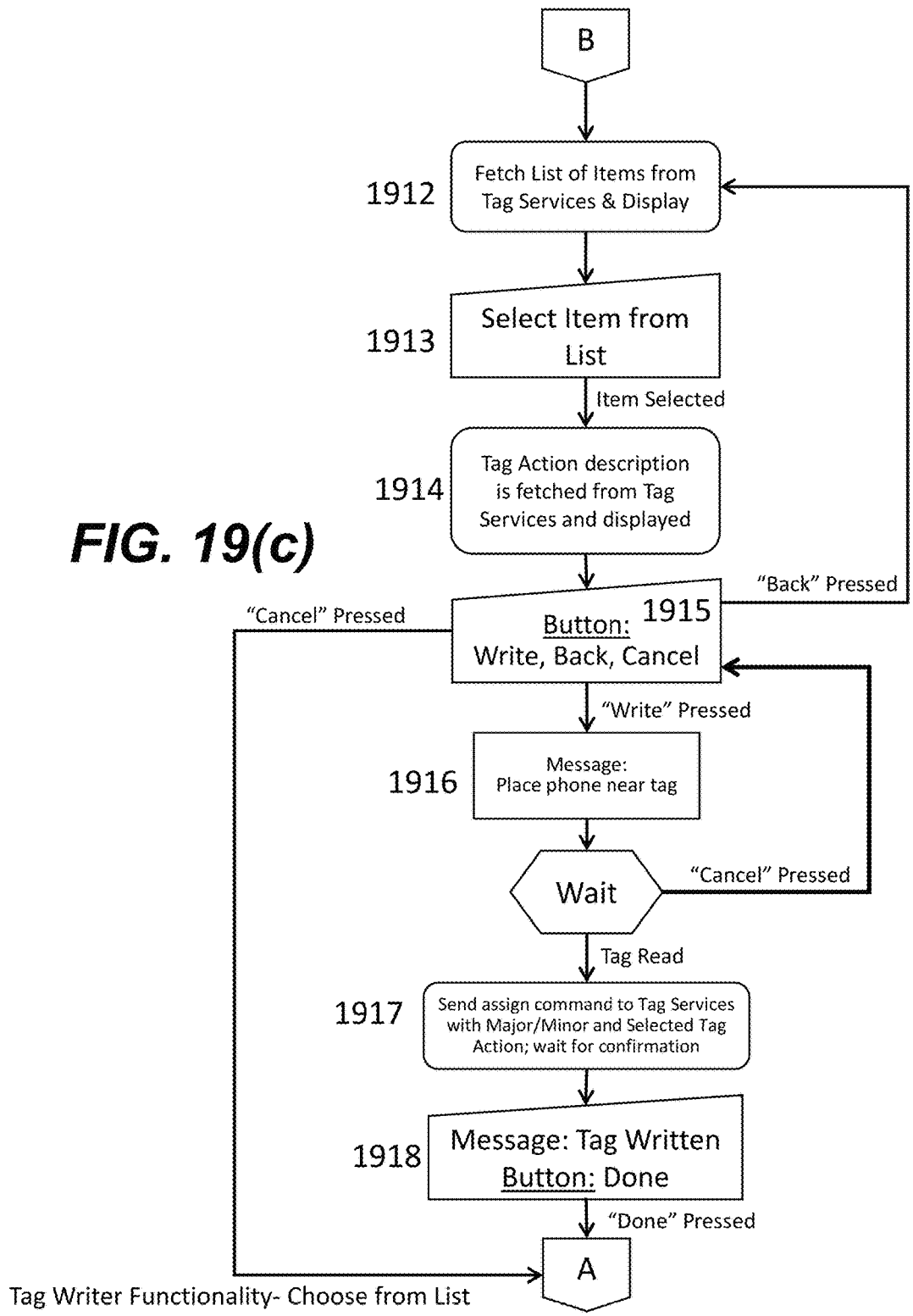

FIG. 19(c) shows an exemplary operation of the tag writer functionality if the "Choose from List" function is selected. In this case, the client module in the device queries the tag services for a list of tag action choices that may be displayed on the device at 1912. The user selects an item from the list at 1913, which prompts the module to query the tag services for detailed information about the selected tag action at 1914 and provide the user with the option to write it to the tag, cancel the transaction, or return to the list to select a different tag action at 1915. Once the proper tag action has been selected and the "write" action is pressed, the module again directs the user to place the his device close to the tag in order to read the Major and Minor values of the tag at 1916. This information is forwarded to the tag services so that the specific tag can be assigned with the selected tag action at 1917. Once confirmation is received, a message is displayed to the user to confirm the completion of the sequence at 1918.

FIG. 19(d) shows an exemplary operation of the tag writer functionality if the "Enter a Code" function is selected. The first choice presented is when the user wants to enter the code manually or scan a UPC code at 1920. If "Manual" is pressed, a dialog box may be presented for the user to enter the code at 1921. If the "UPC" button is selected, then a UPC scanner window is opened, the user lines up the UPC code to be scanned in a displayed window and the scanner automatically reads the code value at 1922. The tag action associated with this code (either entered manually or scanned) is then fetched from the tag services and displayed to the user at 1923. If this is the desired tag action, then the user selects a "write" action or the user may select the "back" or "cancel" buttons if it is not the correct tag action at 1924. When the "write" action is pressed, the client module again directs the user to place his mobile device close to the tag in order to read the Major and Minor values of the tag at 1925. This information is forwarded to the tag services so that the specific tag can be assigned with the selected tag action at 1926. Once confirmation is received, a message is displayed to the user to confirm the completion of the sequence at 1927.

Figure 20:
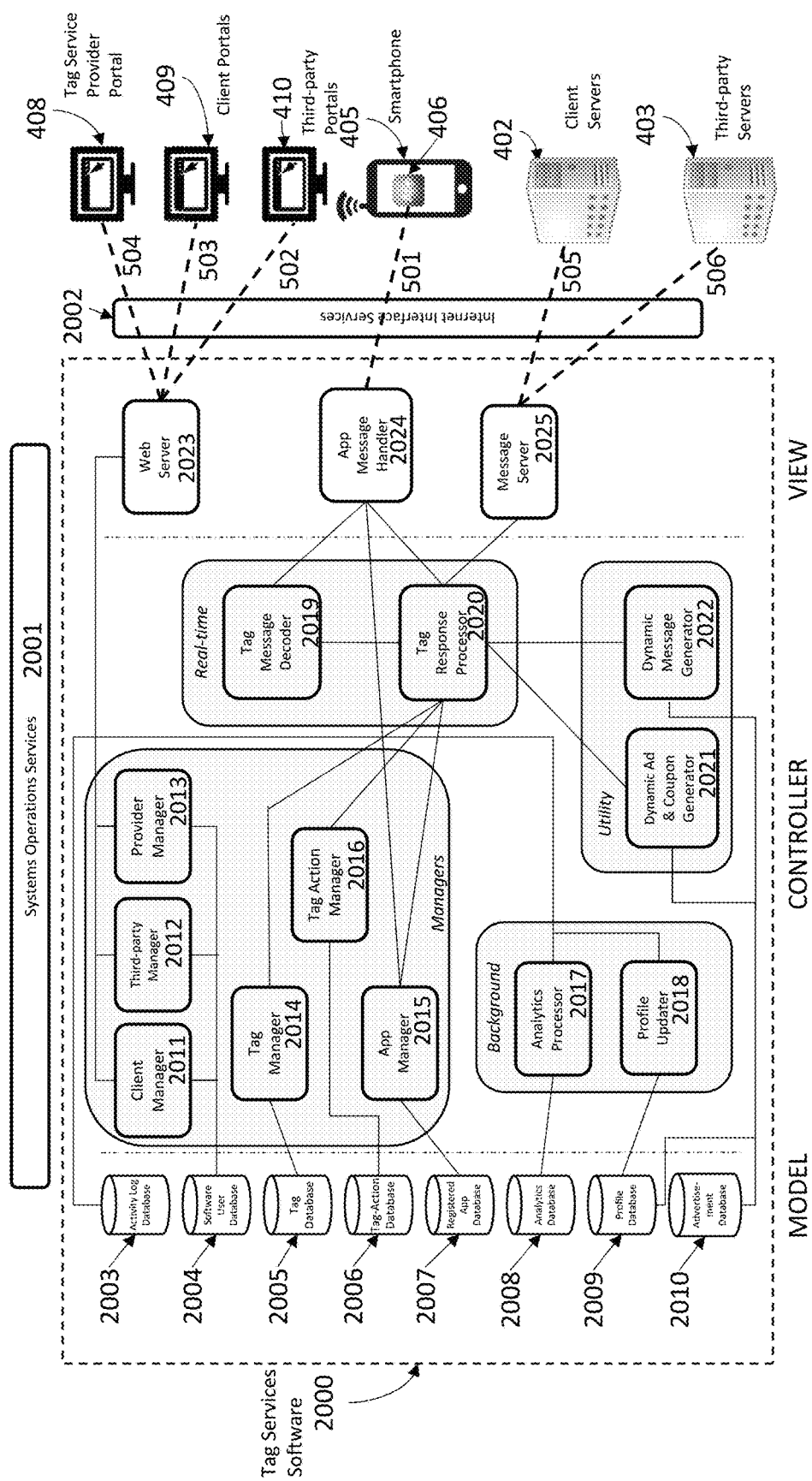
FIG. 20 shows a functional block diagram of a server module providing tag services according to one embodiment of the present invention.

Referring now to FIG. 20, it shows a function block diagram of a server module 2000 according to one embodiment of the present invention. The server module 2000 is specially designed and configured to provide the tag services, some of which has already be described above. As those skilled in the art, a general computer does not have the ability, nor equipped with the necessary mechanism, to perform the tag services described in the present invention. In one perspective, the server module 2000 may correspond to the server module 219 of FIG. 2 or FIG. 5, and is preferably loaded in a computing device (e.g., a server) or may be distributed across a number of servers co-located in the same data center or distributed across multiple data centers. For simplicity of description, FIG. 20 depicts a single server deployment.

As shown in FIG. 20, The server module 2000 includes a number of processes, data stores, and databases. Those skilled in the art shall appreciate that the processes, stores or databases may be combined to less than those shown in FIG. 20 with departing from the intended operations of the server module 2000. According to one embodiment, an activity log database 2003 is used to record every event executed on or processed by one of the processes running as part of the tag services 2000. This would include such events as: tag reads, tag writes, client logins, client logouts, tag-actions created, modified, or executed, and messages sent to other servers. In one embodiment, all of the events are saved in a single database. In a second embodiment, the most common events such as tag reads and executed tag-Actions are stored in a separate databases for performance reasons.

A database 2004 is provided to include information pertaining to a service provider, a client, or a third party (collectively referred to as an agent) that makes use of the tag services. A tag database 2005 is provided to include information on all tags that are deployed by an operator using this particular tag services. A tag-action database 2006 is provided to contain all tag-actions that have been defined by the operator using this particular tag services. The registered app database 2007 is provided to contain information concerning a number of copies of the module downloaded by users and deployed on their devices. When one module containing the tag reader or tag writer functionality is installed, the device is registered with the tag services before the read or write functionality can be performed.

An analytics database 2008 is provided to contain analytics information that has been created by an analytics processor 2017 while a profile database 2009 is provided to keep a profile of each of the users who have registered the downloaded module with the tag services to access a service by reading a tag being associated with the tag services. The profile is created by a profile processor 2018 and made available to a dynamic Ad & coupon generator 2021 and a dynamic message generator 2022.

An advertisement database 2010 is provided to contain advertisement rules and content used by the dynamic Ad & coupon generator 2021 and the dynamic message generator 2022 to present relevant advertisements to a client module being executed on a mobile device. Although it is possible to send other promotion messages to a user having a device running the client module, the promotion messages including an advertisement or a coupon are generally related to a product the user has stopped to pay a close attention to, where there is a tag disposed nearby.

A web server interface 2023 handles all HTTP or HTTPS communication with a tag service provider portal 408, client portals 409 or third-party portals 410. The web server interface 2023 allows an agent to configure or manage the tag services 419, for example, using conventional web-based mechanisms such as HTML. As such it passes messages and creates pages for interacting with the management processes in a controller portion including: a provider manager 2013, a client Manager 2011, and a third party manager 2012.

A message handler 2024 handles all messages to and from a client module residing on devices that may be caused to receive broadcasts from deployed tags. In one embodiment, it forwards messages received from a device to and from a tag message decoder 2019 and a tag response processor 2029, respectively. In one embodiment, the messaging structure used for communication with the module is a RESTFUL interface using HTTP or HTTPS and JSON element encoding. In another embodiment, the Google Data format is used for the messaging exchanges.

The message server 2025 handles all server-to-server messages between the tag services processes and one or more client servers 402 and one or more third-party servers 403. This communication occurs across communication flows 505 and 506, respectively via Internet Interface Services 2002. The message exchange occurs between these servers and several of the processes within the Controller portion of the MVC architecture, but primarily with the Tag Response Processor 2020.

The controller portion implements all of the control logic for the tag services. These control processes can be grouped into four categories:

The managers that are responsible for managing the primary entities: tags, tag-actions, modules, provider, clients or a third-party.

Background processes that analyze the activity of a device reading a tag to create analytics, profiles of the service usage and attributes, and interests of the users.

Utility processes that provide dynamic message information for real-time processing elements.

The real-time processing elements responsible for receiving, validating and responding to tag readers and tag writers implemented as part of the client module.

The manager processes shown in FIG. 20 represent one embodiment of an implementation of this functionality within the tag services and are described in the following paragraphs.

The provider manager 2013 controls all of the information needed by a micro-proximity service provider. This includes user information which is retained in the user database 2004. The primary interface to this process is via the server interface 2023.

The client manager 2011 controls all information pertaining to a client who subscribes to the tag services. This includes information pertaining to locations of all tags, a client server, and a client module, and clients agents which are retained in the user database 2004.

The third-party manager 2012 controls all information pertaining to the third-parties who are partnered with clients and/or service Provider and subscribe to the tag Services. This includes information pertaining to clients, third-party servers, client modules and third-party agents all of which are retained in the user database 2004.

The tag manager 2014 manages all actions and activities associated with the deployed tags 404 being used as part of the tag services. This would include information about the location of the tags, what tag-actions they are assigned to, with which a client or third-party that they are registered, their specific unique tuple [UUID, TagID], and how long they have been in operation. In the depicted embodiment shown in FIG. 20, this information is stored in the tag database 2005 and the primary process that uses the tag manager services is the tag message decoder 2019.

A tag-action manager 2016 is provided to manage all tag-actions that have been configured by the users of the tag services. In the depicted embodiment shown in FIG. 20, this information is stored in the tag-action database 2006 and the primary process that uses its services is the tag response processor 2020.

The app manager 2015 manages information pertaining to all versions of a client module that have implemented to include either a tag reader or tag writer function or both as part of their operation. all of the client modules must be registered with the manager 2015 prior to being able to read or write a tag. This process manages the registration process and retains the pertinent registration information. In the depicted embodiment as shown in FIG. 20, this information is stored in the registered app database 2015 and communicates primarily with the tag response processor 2020 and the app message handler 2024.

A background process depicted in FIG. 20 represents an implementation within the tag services: an analytics processor 2017 reads the activity log database 2003 and analyzes, categorizes, accumulates, and summarizes many discrete actions recorded there into statistics that can be used to generate usage reports for a provider, clients, or third-parties. These statistics are preserved in the analytics database 2008. The analytics processor 2017 generates these reports either on demand, or on a pre-defined schedule, for the provider, clients, and third-parties as has been previously configured via their respective portals (e.g., the portals 208, 209, 210) and the manager processes 2013, 2011, 2012, respectively.

A profile updater 2018 is responsible for maintaining and updating a profile for each user who has registered to opt to the tag services. It does so by reading the activity log database 2003, filtering and correlating which users, identified by an advertiser ID, and accessing information about which products or services identified in the tag actions that they have requested by reading the tags. Aspects of a user profile that are updated include:
  Commercial category (interest in a particular product or service)
  Purchase propensity
  Stage within purchase cycle
  Location category
    Frequency, time-of-day, length of visit, first-time or repeat visit
    Next-hop relationship
    Geography
  Demographics and psychographic defined commercial categories
  Lifestyle
  Other
    Brand loyalty
    Frequency of purchase
    Life stage/life changing events
    Micro-clusters defined by a client
The user profile information is retained in the profile database 2009.

The utility processes depicted in FIG. 20 represent an implementation of the tag services and are described in the following paragraphs. Upon request from the tag response processor 2020, the dynamic Ad & coupon generator 2021 uses the profile database 2009 and the advertisement database 2010 to generate a targeted, specific advertisement for a given user in response to that user reading a tag. For example, the tag action associated with a given tag that has been read might be to send a mobile advertisement to a mobile device. The selection of the appropriate advertisement would be predicated on knowing something about the user thereof, which is available in the profile database 2009, and the type of advertisement campaign currently in flight, which is available in the advertisement database 2010.\

The dynamic message generator 2022 performs a similar function as the dynamic Ad & coupon generator 2021. However in this case, a customized message is sent to a client (e.g., a client server 202 or a third-party server 203). For example, a message may be sent to an advertising network server indicating that a user with a given advertisement ID is currently shopping at a particular store, making inquiries about a particular type of product. This directive can be defined as part of a tag action and requested by the tag response processor 2020. The profile of the user together with rules regarding what information can be shared are stored in the profile database 2009 and advertisement database 2010, respectively.

The real-time processes depicted in FIG. 20 represent one embodiment of the tag services 2000. The tag message decoder 2019 receives messages from a client module via the App message handler 2024. One embodiment of such a message is the JSON sighting message 1812. Using the Tag ID decryptor described above and illustrated in FIG. 11 and FIG. 12, the tag message decoder determines the unique Tag ID from the major and minor values included in the sighting message. This together with the other fields in the sighting message 1812 and the IP Address of the device reading the tag are sent to the tag response processor 2020 for processing.

The tag response processor 2020 is designed to responsible for accepting the incoming sighting messages and other messages from a client module and determining what the response should be based upon the decrypted Tag IDs, UUIDs, and Application ID presented to it by the tag message decoder 2019. It uses the Tag ID and UUID to query the tag manager 2014 for all tag actions identifiers associated with this particular tag. With this information, it queries the tag action manager 2016 to determine what tag actions must be executed. Because there may be multiple client modules that are sending sighting messages 1812 for the same tag, the tag response processor 2020 must query the app manager 2015 to determine which client module has the precedence. Based upon the tag actions that need to be executed, dynamic ads or coupons may need to be generated by the dynamic Ad & coupon generator 2021 and dynamic customized messages might need to be generated by the dynamic message generator 2022. Lastly, the tag response processor 2020 executes the requested tag action by sending the appropriate response messages, such as response message 1813 to the appropriate client module via the message handler 2024 and/or to the client server and/or a third-party server via a message server 2025.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

We claim:

1. A method for determining a location of a tag, the method comprising:

receiving in a server a message from a device caused to receive a broadcast from a tag, wherein the device is disposed at a location, the tag is attached to a user moving in an establishment deployed with a plurality of devices, the broadcast includes at least one data packet, the message is generated by a client module being executed in the device in responding to the broadcast, and includes an identity of the tag and an estimated distance determined by the client module in reference to a transmission power of the broadcast received in the device;

updating a profile created for the user in reference to the received message, wherein the profile includes information pertaining to the identity of the tag; and requesting an updated message from the device regarding the tag wherein a movement trajectory of the user is formed in the server by receiving respective messages from some of the devices that have received the broadcast from the tag, the profile is updated with the movement trajectory, and wherein the tag comprises:

a battery:

an antenna:

a wake-up timer to turn on and off operations of the tag per a predefined timing, wherein the tag acts as a transmitter to transmit the broadcast in accordance with a wireless standard;

a state machine controller provided to randomize data; and a direct digital synthesizer provided to synthesize signal waveforms based upon the data provided by the state machine controller and generate data packets for broadcasting via the antenna.

2. The method as recited in claim 1, further comprising:

generating in the server a response to the message in accordance with the identity of the tag and the profile; and sending the response to the device, wherein the client module is configured to cause the device to perform an action with respect to the tag.

3. The method as recited in claim 1, wherein the user is tracked per the movement trajectory within the establishment.

4. The method as recited in claim 1, wherein a designated service is provided to the user when the user is approaching one of the devices.

5. The method as recited in claim 1, wherein the tag further comprises a memory space to store at least one identifier of one tag action included in the broadcast, the device receiving the broadcast is caused to react per the tag action specified by the identifier.

6. The method as recited in claim 1, wherein the tag is coupled to a motion sensor to detect a presence of the tag so as to wake up the tag to generate the broadcast.

7. The method as recited in claim 1, wherein each of the devices is coupled to the server, and the server executes a server module configured to determine which of the devices that the tag is close to by receiving respective messages from some of the devices that have received a broadcast from the tag.

8. The method as recited in claim 7, wherein the establishment is a restaurant and the user is a customer in the restaurant, the device is a mobile device associated with the user to receive an electronic service, and the electronic service includes a menu presentation, a service request from the customer, a bill presentation, making a payment on the mobile device.

9. The method as recited in claim 1, wherein the establishment is a fair and the user is a participant in the fair, the devices are deployed across the fair, each of the devices is coupled to the server, the server executes a server module configured to determine which of the devices that have received a broadcast from the tag, wherein the tag is being associated with the participant in the fair, the server module is configured to determine which stops the participant has made from the devices that have received a broadcast from the tag.

10. A system for determining a location of a tag, the system comprising:

a plurality of devices respectively disposed around an establishment, each of the devices executing a client module configured to cause the each of the devices to receive a broadcast from the tag attached to an user, wherein the tag is designed to generate the broadcast from time to time in accordance with a wireless standard, a device receives the broadcast when the user moves close to the device, wherein a movement trajectory of the user is determined in a server by receiving respective messages from some of the devices that have received a broadcast from the tag, wherein the tag comprises:

a battery:

an antenna:

a wake-up timer to turn on and off operations of the tap per a predefined timing, wherein the tag acts as a transmitter to transmit the broadcast in accordance with a wireless standard:

a state machine controller provided to randomize data; and a direct digital synthesizer provided to synthesize signal waveforms based upon the data provided by the state machine controller and generate data packets for broadcasting via the antenna; and the server, remotely located with respect to the devices, executing a server module to communicate with each of the devices, the server receiving a message from the device when the device receives the broadcast from the tag, wherein the message is generated by the client module being executed in the device in responding to the broadcast, and includes an identity of the tag and an estimated distance determined by the client module in reference to a transmission power of the broadcast received in the device, the identity includes a universally unique identifier (UUID) and an identifier (ID) of the tag, and wherein the ID is encrypted.

11. The system as recited in claim 10, wherein the client module is configured to decrypt the encrypted ID in accordance with a corresponding decryption scheme so that only a registered client module is authorized to digest the broadcast from the tag.

12. The system as recited in claim 11, wherein the client module in each of the devices is registered with the server, and the device is caused to send the message to the server, wherein the message includes at least the ID of the tag, an estimated distance determined by the client module in reference to a transmission power of the broadcast received in the device.

13. The system as recited in claim 12, wherein the client module in the device is configured to determine the estimated distance from the broadcast received in the device by comparing a designed power of the broadcast at a predefined distance to a measured power actually received by the device.

14. The system as recited in claim 11, wherein the transmission power varies from one moment to another moment.

15. The system as recited in claim 14, wherein the tag includes a table to control when the transmission power is increased and when the transmission power is decreased.

* * * * *